United States Patent [19]

Kaji et al.

[11] Patent Number: 5,673,124
[45] Date of Patent: Sep. 30, 1997

[54] IMAGE SCANNER HAVING SYSTEM EXTENDING FUNCTION AND IMAGE CORRECTING FUNCTION

[75] Inventors: Yukio Kaji, Ishikawa; Norio Kanemitsu, Kawasaki; Mikio Murosaki, Ishikawa, all of Japan

[73] Assignees: PFU Limited, Ishikawa; Fujitsu Limited, Kawasaki, both of Japan

[21] Appl. No.: 447,808

[22] Filed: May 23, 1995

[30] Foreign Application Priority Data

| May 24, 1994 | [JP] | Japan | 6-109863 |
| Sep. 20, 1994 | [JP] | Japan | 6-224942 |

[51] Int. Cl.⁶ .............. H04N 1/04; H04N 1/32; G06F 17/00; G06F 15/00
[52] U.S. Cl. .......... 358/474; 358/468; 358/497; 395/113; 395/114
[58] Field of Search .............. 358/474, 468, 358/486, 496, 497; 364/478; 395/113, 114

[56] References Cited

U.S. PATENT DOCUMENTS

| 4,794,460 | 12/1988 | Shiota | 358/244 |
| 5,146,351 | 9/1992 | Maehara | 358/448 |
| 5,206,501 | 4/1993 | Sakakibara et al. | 358/461 |
| 5,214,520 | 5/1993 | Miyazawa | 358/461 |
| 5,274,567 | 12/1993 | Kallin et al. | 364/478 |
| 5,293,257 | 3/1994 | Masao | 358/472 |

FOREIGN PATENT DOCUMENTS

| 0291042 A2 | 11/1988 | European Pat. Off. |
| 0 590 609 A1 | 4/1994 | European Pat. Off. |
| 2 202 349 A | 9/1988 | United Kingdom. |
| 2202349 | 9/1988 | United Kingdom. |

OTHER PUBLICATIONS

EP-A-0,291,042 A3 (Mita Industrial) abstract; figure 1; Document Scanning Machine; Nov. 17, 1988.
Patent Abstracts of Japan, vol. 18, No. 278 (P-1743), May 26, 1994 & JP-A-06 044351, Feb. 18, 1994.

*Primary Examiner*—Kim Vu
*Assistant Examiner*—Tia M. Harris
*Attorney, Agent, or Firm*—Nikaido, Marmelstein, Murray & Oram LLP

[57] ABSTRACT

In an image scanner having a flat bed type structure and an automatic document feeding type structure, the scanner includes: an image read unit at least including a lamp, a mirror and CCD sensors to read a manuscript which is put on the structure; an image control unit operatively connected to the image read unit to process an image read by the image read unit; a host computer operatively connected to the image control means; and the image control unit including a main printed-circuit board provided for the original functions of the image scanner, a main connector connecting the image control means to the host computer, a user printed-circuit board selectively provided by a user as an extended slot and the board being mounted within the image control unit, and a user connector connecting the main printed-circuit board to the user printed-circuit board. Further, the image scanner has a function of correction for a difference in an image output between the FB type and the ADF type by adjusting a change rate from the white/black reference level, the gain of the amplifier, the lamp current, or a predetermined conversion formula.

2 Claims, 19 Drawing Sheets

(IN)   (REFW)   (REFB)

WAVEFORM
READ FROM
MANUSCRIPT

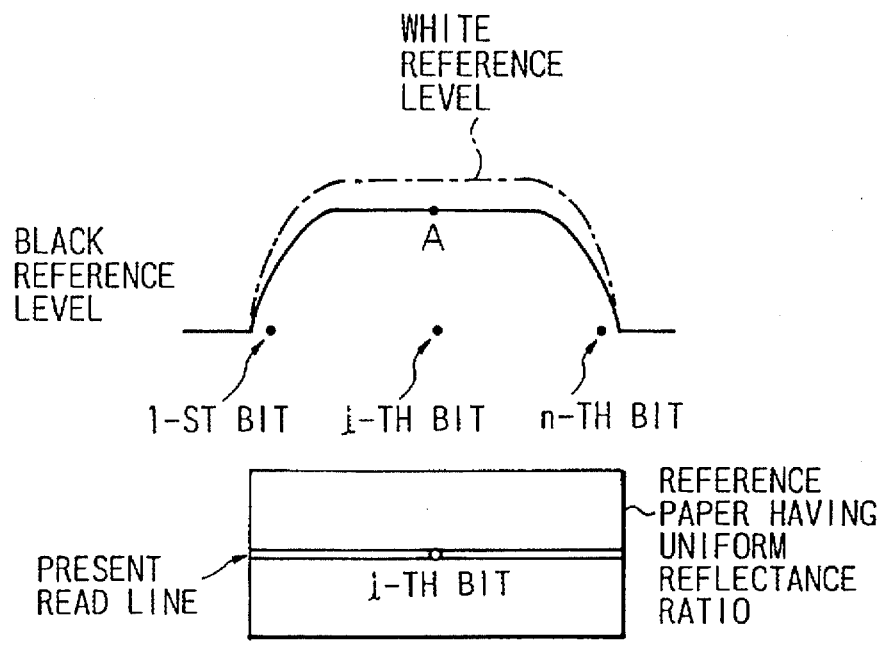
Fig.17A
Fig.17B
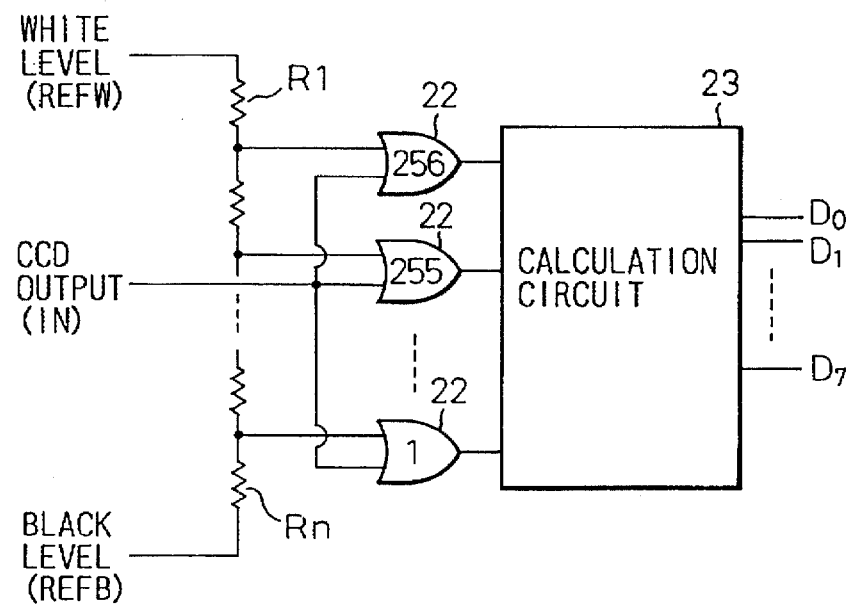
Fig.18

IMAGE SCANNER HAVING SYSTEM EXTENDING FUNCTION AND IMAGE CORRECTING FUNCTION

BACKGROUND OF THE INVENTION

1. Field of the Invention

The present invention relates to an image scanner and, more particularly, it relates to an image scanner having a system extending function and an image correcting method between two types of the image scanner, i.e., a flat bed type and an automatic document feeding type.

2. Description of the Related Art

Recently, image scanners have become widely utilized in various fields, for example, communication, business, designs, education, arts, etc. Accordingly, various functions are required in a recent image scanner in order to satisfy a user's request. One of functions is an extended slot which can be easily realized by the user.

On the other hand, in general, the image scanner is available in two typical types in accordance with the structural difference, i.e., the flat bed (FB) type and the automatic document feeding (ADF) type. The main difference between the FB type and the ADF type lies in that a manuscript is not moved in the former, and the manuscript is moved in the latter when it is read by an image read means. In another aspect of the present invention, the difference of an image output between the FB type and the ADF type can be eliminated.

SUMMARY OF THE INVENTION

The first object of the present invention is to provide an image scanner having a function of an extended slot which can be easily mounted by a user within the image scanner.

The second object of the present invention is to provide a correction method in an image scanner having a correcting function for a difference between an image output from a flat bed type image scanner or from an automatic document feeding type image scanner.

In accordance with a first aspect of the present invention, there is provided an image scanner preferably having a flat bed type structure and an automatic document feeding type structure, including: an image read unit at least including a lamp, a mirror and CCD sensors to read a manuscript which is put on said structure; an image control unit operatively connected to the image read unit to process an image read by the image read unit; a host computer operatively connected to the image control unit; and the image control unit including a main printed-circuit board provided for the original functions of the image scanner, a main connector connecting the image control unit to the host computer, a user printed-circuit board selectively provided by a user as an extended slot and the board being mounted within the image control unit, and a user connector connecting the main printed-circuit board to the user printed-circuit board.

In a preferred embodiment, the image control unit further includes: a control circuit operatively connected to said CCD sensors; a microprocessor connected to the control circuit; a driver and a driver/receiver both connected to the control circuit; a video connector connected to the driver to send image signals to the host computer; a control connector connected to the driver/receiver to send and receive control signals to/from the host computer; and an extended connector connected between the control circuit and the extended slot to send and receive the image/control signals to/from the extended slot without passing through the driver and driver/receiver.

In another preferred embodiment, the extended connector is set to valid state when the extended slot is connected thereto.

In still another preferred embodiment, the extended connector is used for testing the difference between an image output from the flat bed type and from the automatic document type.

In still another preferred embodiment, the image control unit further includes a selection circuit operatively connected between the control circuit and the extended connector for selecting connection to either the driver/receiver or said extended slot.

In accordance with a second aspect of the present invention, there is provided a correction method in an image scanner having a flat bed type structure and an automatic document feeding type structure, comprising: a white reference portion provided on a glass plate which holds a manuscript; a black reference portion provided adjacent to the white reference portion; a lamp unit for irradiating light onto the manuscript; a mirror for reflecting the light irradiated from the lamp to said manuscript; CCD sensors for converting images on the manuscript to electric signals; the lamp unit, the mirror and the CCD sensors forming an image read unit used commonly in the FB type and the ADF type; an AGC amplifier connected to the CCD sensors for amplifing an output of the CCD sensors and controlling the gain thereof; a microprocessor; a D/A converter for adjusting the gain of the AGC amplifier in accordance with control by the microprocessor; a sample-hold means for sampling an output from the AGC amplifier;

a white level memory for storing a white reference level which is obtained by reading the white reference portion; a white level D/A converter for converting an analog white reference level signal, which is read from the white level memory, to a digital signal; a black level memory for storing a black reference level which is obtained by reading the black reference portion; a black level D/A converter for converting the analog black reference level signal, which is read from the black level memory, to the digital signal; an A/D converter having an input terminal for receiving the analog signal from the sample-hold means, a white reference terminal for receiving the output from the D/A converter, and a black reference terminal for receiving the output from the D/A converter, and outputting the digital signal; a work RAM for storing various working data; and an $E^2PROM$ for storing resultant data;

wherein correction of the difference of an image output between the FB type and the ADF type is performed in such a manner that; first, the image read unit of the FB type reads a reference manuscript having uniform reflectance ratio, and a first output of the A/D converter is stored in the work RAM; next, the image read unit of the ADF type reads the same reference manuscript and outputs a second output from the A/D converter, further, a level of the white reference level signal at the white reference terminal of the A/D converter is adjusted by controlling the D/A converter for the AGC which is controlled by the microprocessor so that the second output becomes equal to the first output, and a change rate of the white reference level signal is stored in the $E^2PROM$ when the first output is equal to the second output; and finally, when the image read unit reads the manuscript by using the ADF type, the output from the white level D/A converter is changed in accordance with the change rate which is stored in said $E^2PROM$.

In a preferred embodiment, the correction of the difference of the image output between the FB type and the ADF type is performed in such a manner that; first, the image read unit of the FB type reads the reference manuscript having a uniform reflectance ratio, and the first output of the A/D converter is stored in said work RAM; next, the image read unit of the ADF type reads the same reference manuscript and outputs the second output from the A/D converter, further, the gain of the amplifier and sample-hold means is adjusted by controlling the D/A converter used for the AGC which is controlled by the microprocessor so that the second output becomes equal to the first output, and the change rate of the gain is stored in the E²PROM when the first output is equal to the second output; and finally, when the image read unit reads the manuscript by using the ADF type, the gain of the amplifier and sample-hold means is changed in accordance with the change rate which is stored in the E²PROM.

In another preferred embodiment, the correction of the difference of the image output between the FB type and the ADF type is performed in such a manner that; first, the image read unit of the FB type reads the reference manuscript having a uniform reflectance ratio, and the first output of the A/D converter is stored in the work RAM; next, the image read unit of the ADF type reads the same reference manuscript and outputs the second output from the A/D converter, further, the tube current of the lamp is adjusted by controlling a D/A converter for tube current which is controlled by the microprocessor so that the second output becomes equal to the first output, and the change rate of the tube current is stored in the E²PROM when the first output is equal to the second output; and finally, when the image read unit reads the manuscript by using the ADF type, the tube current of the lamp is changed in accordance with the change rate which is stored in said E²PROM.

In still another preferred embodiment, the correction of the difference of the image output between the FB type and the ADF type is performed in such a manner that; first, the image read unit of the FB type reads the reference manuscript having a uniform reflectance ratio, and the first output of the A/D converter is stored in the work RAM; next, the image read unit of the ADF type reads the same reference manuscript and outputs the second output from said A/D converter, further, in accordance with the first and second outputs, a conversion formula is generated so that the first output becomes equal to the second output, and the resultant formula is stored in the E²PROM; and finally, when the image read unit reads the manuscript by using the ADF type, the output of the A/D converter is changed in accordance with the resultant formula which is stored in said E²PROM by using the microprocessor.

BRIEF EXPLANATION OF THE DRAWINGS

In the drawings:

FIG. 17A is a waveform of the image output in the read operation by the FB type;

FIG. 17B is a read line on a reference paper of FIG. 17A;

FIG. 18 is a detailed circuit diagram of the A/D converter 16 of FIG. 14;

DESCRIPTION OF THE PREFERRED EMBODIMENTS

Figure 1:
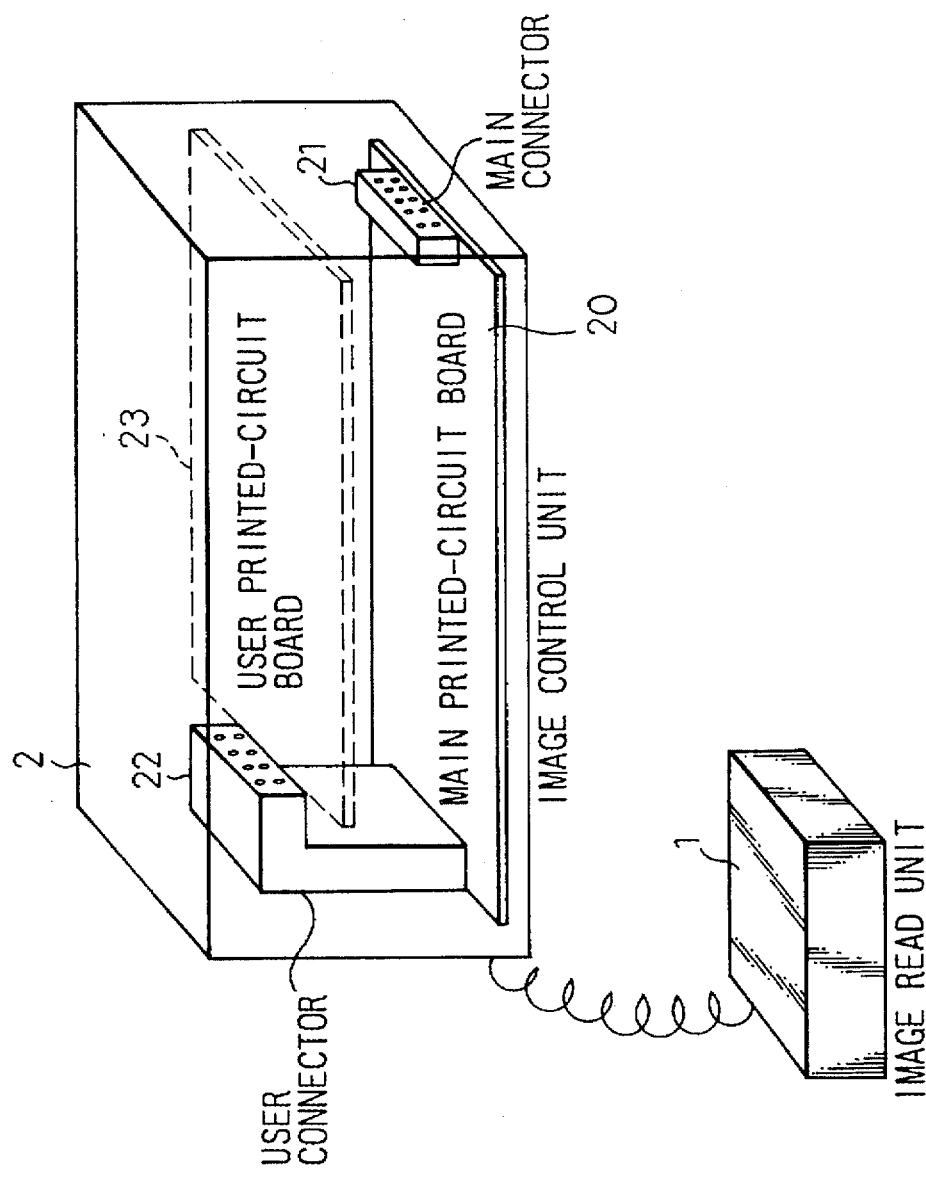
FIG. 1 is a basic structure of an image scanner including an image read unit and an image control unit which is connected to the image read unit.

FIG. 1 is a basic structure of an image scanner including an image read unit and an image control unit which is connected to the image read unit. The image read unit 1 includes CCD image sensors to read a manuscript. The image control unit 2 includes: at least one main printed-circuit board 20 having various functions which are essentially provided to operate the image scanner; a main connector 21 to connect the main printed-circuit board 20 to an external stage (i.e., host computer); and a user connector 22 to connect the main printed-circuit board 20 to a user printed-circuit board 23 which is selectively provided by a user.

Although a detailed operation will be explained with reference to FIG. 2, briefly, the image control unit 2 receives a control signal from an external stage through a receiver, sends the control signal to the external stage through a driver, and sends an image signal to the external stage through the driver. Further, the image control unit 2 controls the operation of the image read unit 1, and sends the image signal to the external stage after predetermined image processing thereto.

The main printed-circuit board 20 has functions to control the operation of the image read unit 1. The main connector 21 outputs the image signal and the control signal to the external stage through the driver which is mounted on the main printed-circuit board 20, and receives the control signal from the external stage through the receiver which is mounted on the main printed-circuit board 20.

The connector 22 is provided for the user printed-circuit board 23 which is selectively mounted by the user, and directly sends the control signal to the user printed-circuit board 23 without passing through the driver/receiver, and directly sends the image signal to the user printed-circuit board 23 without passing though the driver.

As one embodiment, when the user printed-circuit board 23 is mounted to the connector 22, the control signal through the main connector 21 becomes invalid and the control signal through the connector 22 becomes valid. As the other embodiment, both connectors 21 and 22 become valid.

As explained above, in the first aspect of the present invention, the connector 22 is provided in the image control unit 2 to mount the user printed-circuit board 23 therein. The connector 22 directly connects the image signal to the user printed-circuit board 23 without passing through the driver, and directly connects the control signal to the user printed-circuit board 23 without passing through the drive/receiver.

That is, the feature of the image control unit 2 lies in that the image signal in the unit 2 is directly provided to the user without passing through the driver and the control signal in the unit 2 is also directly provided to the user without passing through the driver/receiver.

Accordingly, when the user wishes to obtain a new image process which is not provided in the image control unit, the user connects the user printed-circuit board 23 to the connector 22. In this case, as explained above, since the image signal from the connector 22 to the user printed-circuit board 23 is not passed through the driver, it is possible for the user to obtain the new image process, which is required by the user, without any limitation provided by the driver.

Further, when the user wishes to connect another new system which cannot be connected by a current external interface of the image control unit, the user provides a new user printed-circuit board which can connect the new system to the connector 22. As explained above, since the image signal and the control signal from the connector 22 to the new user printed-circuit board 23 are not passed through the driver/receiver, it is possible for the user to obtain the new image process, which is required by the user, without any limitation provided by the driver/receiver.

Figure 2:
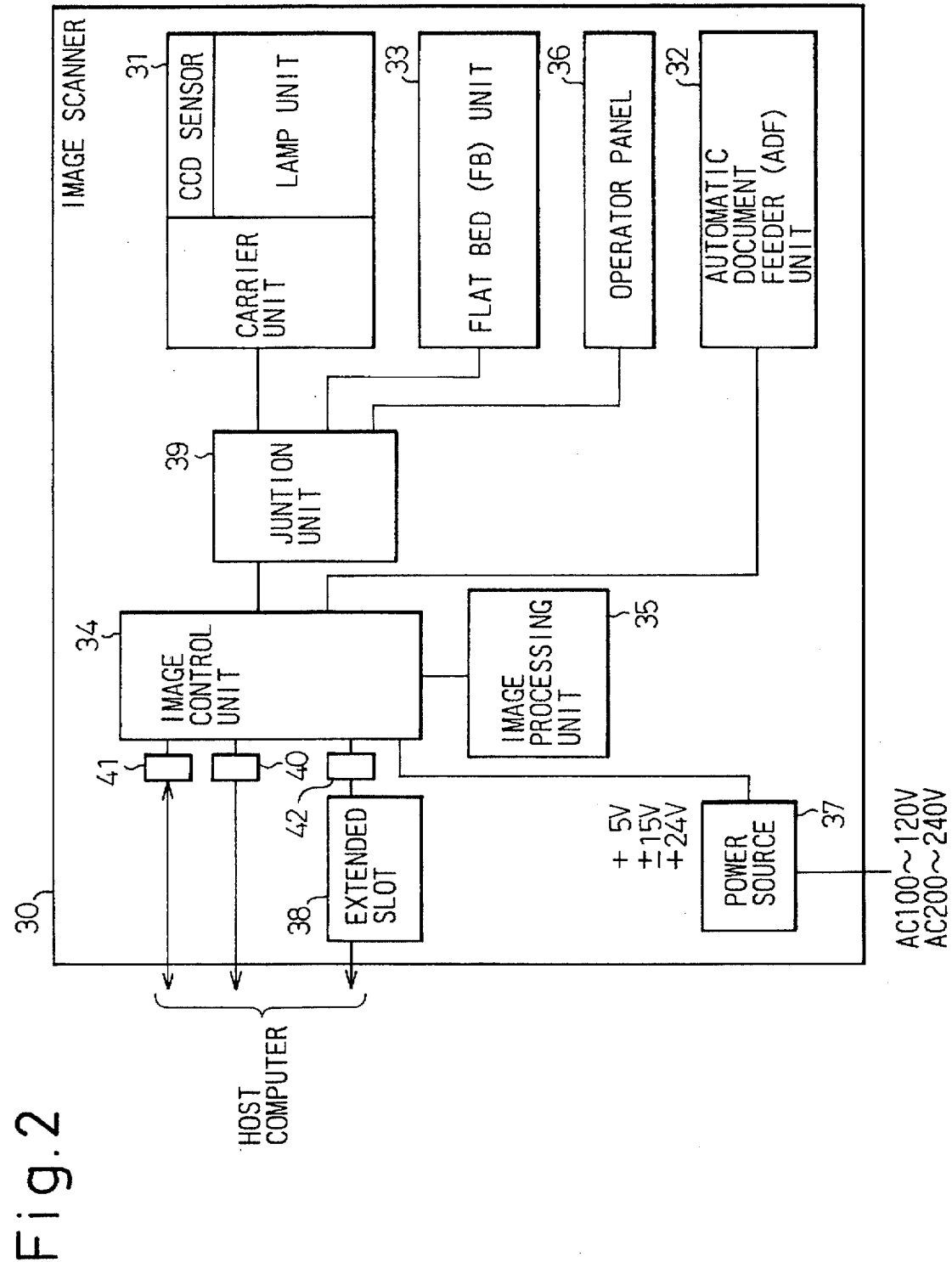
FIG. 2 is a detailed block diagram of the image scanner.
Figure 3:
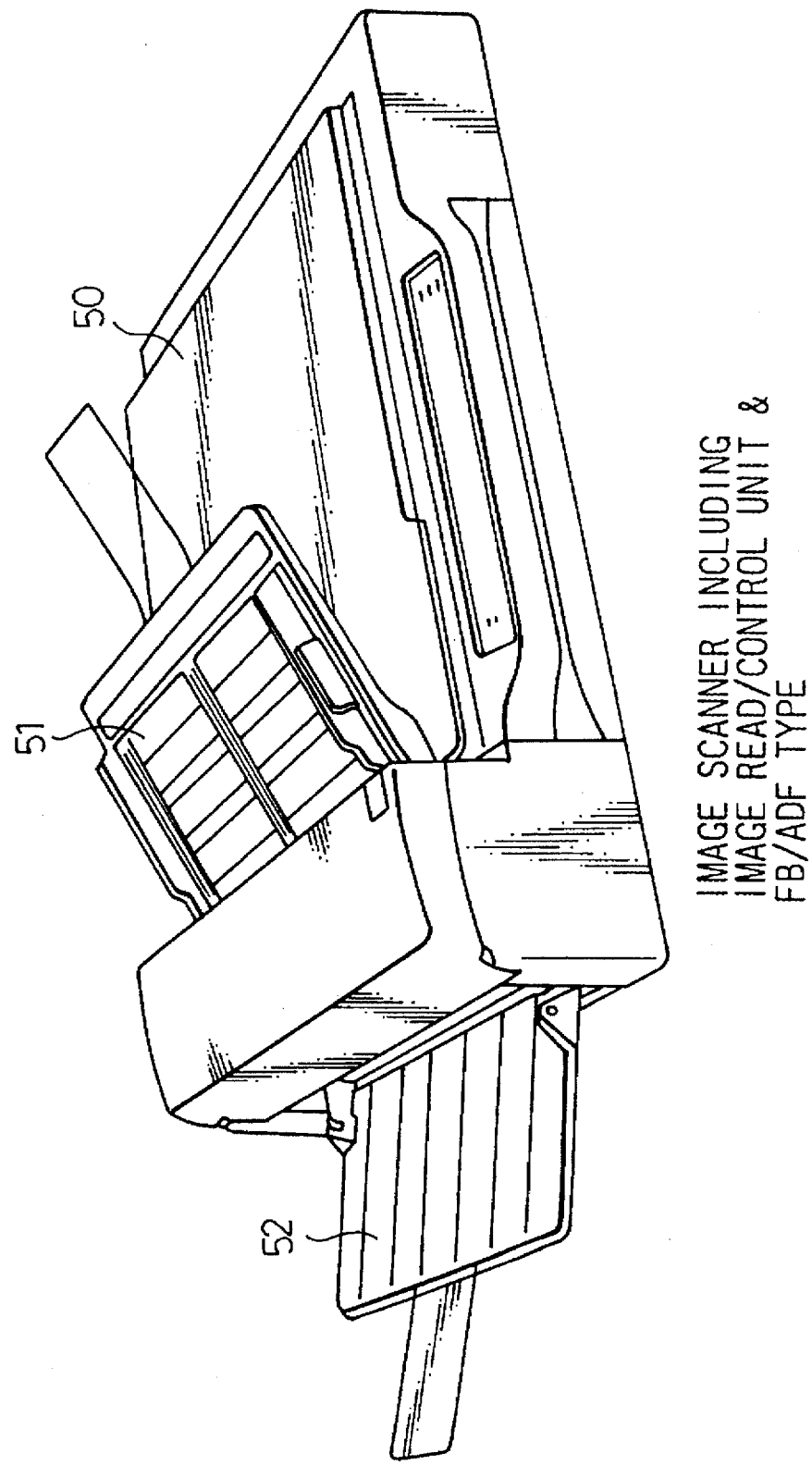
FIG. 3 is a perspective view of the image scanner.

FIG. 2 is a detailed block diagram of the image scanner, and FIG. 3 is a perspective view of the image scanner. In FIG. 2, the image control unit 30 includes a carrier unit 31, an automatic document feeder (ADF) unit 32, a flat bed (FB) unit 33, an image control unit 34, an image processing unit 35, an operator panel 36, a power source 37, an extended slot 38, a junction unit 39, a video connector 40 for the image signal, a control connector 41 for the control signal, and an extended connector 42 for the extended slot 38. The connectors 40 and 41 are connected to a host computer.

The carrier unit 31 corresponds to the image read unit 1 of FIG. 1 and includes CCD image sensors and a lamp unit for reading an image from a manuscript.

The ADF unit 32 is formed by a glass plate, to hold the manuscript, a stacker to store the manuscript after read operation, a feeding mechanism to feed the manuscript one by one, an ADF motor to move the feeding mechanism, and various sensors to control the operation of the feeding mechanism and rotation of the ADF motor.

The FB unit 33 is formed by the flat bed to hold the manuscript, a carrier motor to move the carrier unit 31, and position sensors to detect the position of the carrier unit 31.

As shown in FIG. 3, the image scanner used for the present invention includes both the ADF type and the FB type. In FIG. 3, reference number 50 denotes the flat bed (FB), and reference number 51 denotes a manuscript base used for the ADF type. Further, reference number 52 is a stacker for the ADF type. In the ADF type, manuscripts on the base 51 are automatically transferred one by one, and each manuscript is read by the image read unit. In the FB type, the manuscript is manually put on the glass plate one by one.

Briefly, the control unit 34 controls the operations of the carrier unit 31, the ADF unit 32 and FB unit 33 in accordance with instructions from a host computer. Further, the image control unit 34 receives image signals read by the carrier unit 31, and performs A/D conversion on the signals. Still further, the image control unit 34 generates various video interface signals, and sends them to the host computer as explained in detail below.

The image processing unit 35 performs various processes on the image signal, for example, emphasis and smoothing of the image, conversion from white image to black image and vice versa, a mirror image generated from the original image, extraction of outline of the image, separation of the image from the manuscript mixed with characters and photos, half-tone dot meshing of the image, and enlargement and reduction of the image.

The operator panel 36 is operated by the user to input various instructions to the image scanner. The power source 37 receives AC voltages, for example, 100 to 120 (v) and 200 to 240 (v), and generates DC voltages, for example, +5 (v), ±15 (v) and +24 (v) to operate the image control unit 34.

The extended slot 38 is equivalent to the user printed-circuit board 23 which is selectively provided by the user when the user wishes to extend the functions of the image scanner. The junction unit 39 is a connector to connect between the image control unit 34 and the carrier unit 31, the FB unit 33 and the operator panel 36. The ADF unit 32 is directly connected to the image control unit 34 without passing through the junction unit 39.

The video connector 40 is provided for connecting between the image control unit 34 and the host computer, and is used to output the image signal to the host computer. The control connector 41 is provided for connecting between the image control unit 34 and the host computer, and is used to input/output the control signal from/to the host computer. The extended connector 42 is provided for connecting between the image control unit 34 and the extended slot. The extended slot 38 is connected to the host computer through the user printer-circuit board.

As explained above, in the first aspect of the present invention, the extended connector 42 is provided for connecting the extended slot 38 which connects the user printed-circuit board within the image scanner.

Figure 4:
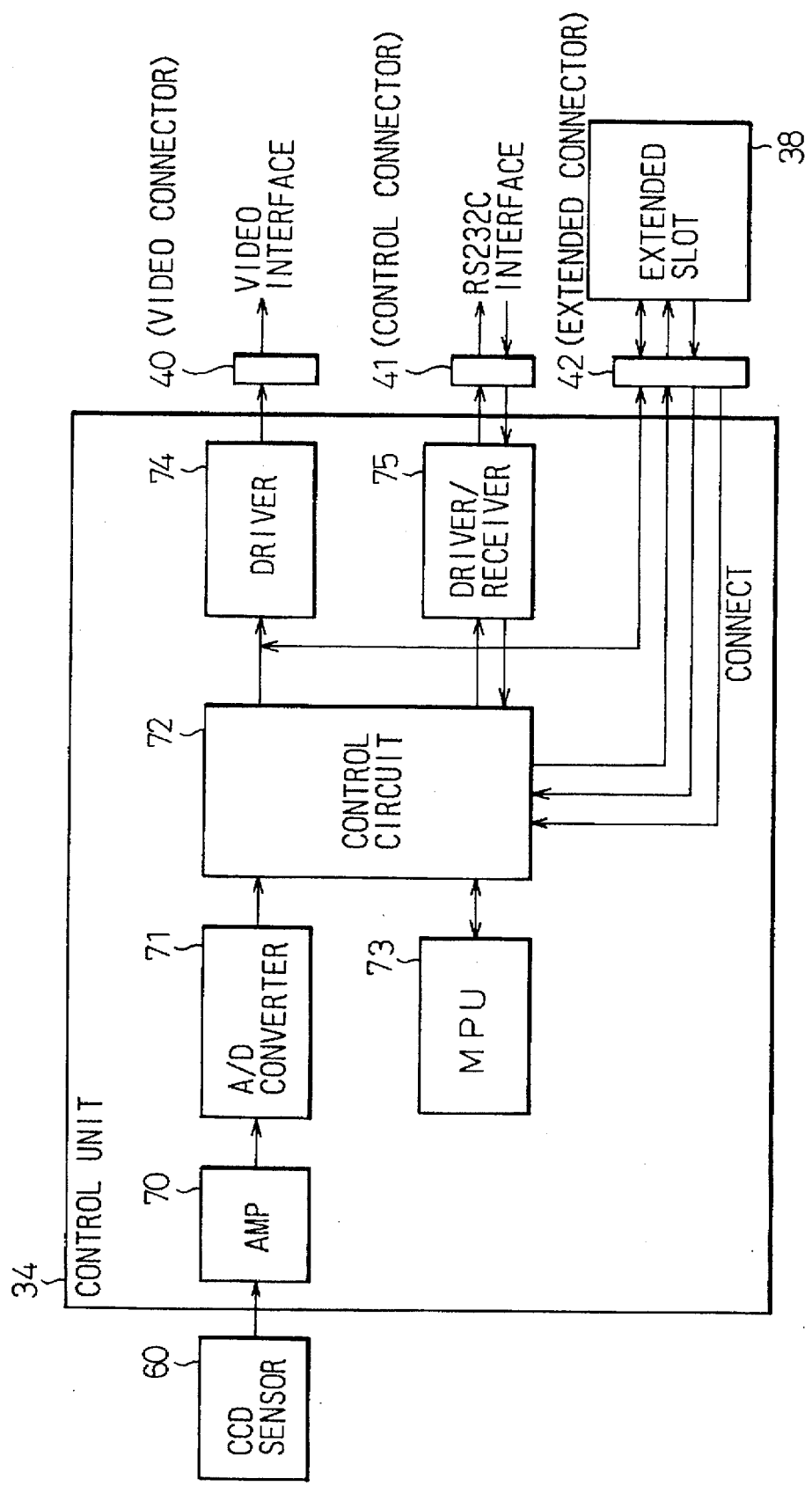
FIG. 4 is a detailed block diagram of a control unit shown in FIG. 3.

FIG. 4 is a detailed block diagram of the image control unit shown in FIG. 3. As shown in the drawing, the image control unit 34 includes: an amplifier (AMP) 70 for amplifying the output of a CCD image sensor 60; an A/D converter 71 for converting analog signals to digital signals; a control circuit 72 for processing output signals from the A/D converter 71 and the carrier unit 31; a micro processor (MPU) 73 for supporting the control circuit 72; a driver 74 for outputting the image signal to the host computer, and a driver/receiver 75 for inputting/outputting the control signal from/to the host computer.

The control circuit 72 is directly connected to the extended slot 38 through the extended connector 42 without passing through the driver 74 to send the image signal, and directly connected to the extended slot 38 through the extended connector 42 without passing through the driver/receiver 75 to send the control signal. That is, the control signal from the control circuit 72 can take two routes, one is connected to the control connector 41 through the driver/receiver 75 and the other is directly connected to the extended connector 42.

A video interface includes various image signals which are output from the driver 74 to the host computer through the video connector 40. A control interface (in general, RS-232-C is used) includes various control signals which are output from the driver/receiver 75 to the host computer through the control connector 41.

Figure 5:
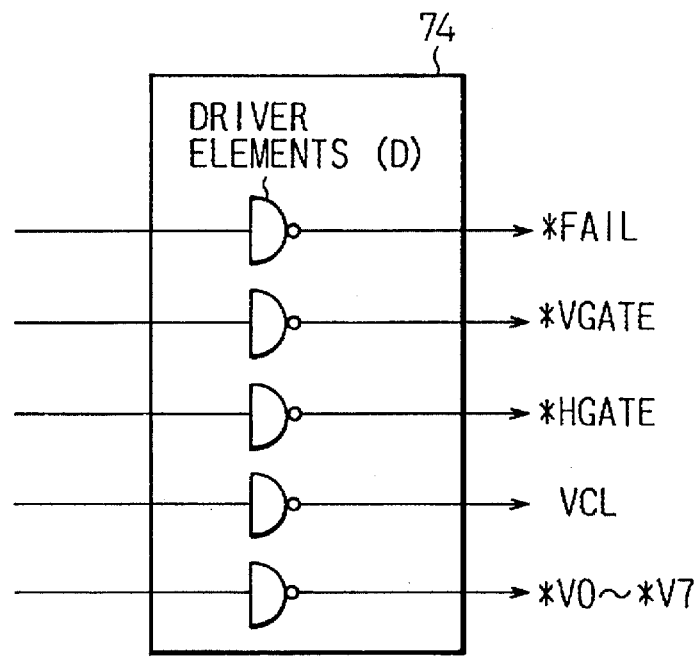
FIG. 5 shows some examples of a video interface for image signals.
Figure 6:
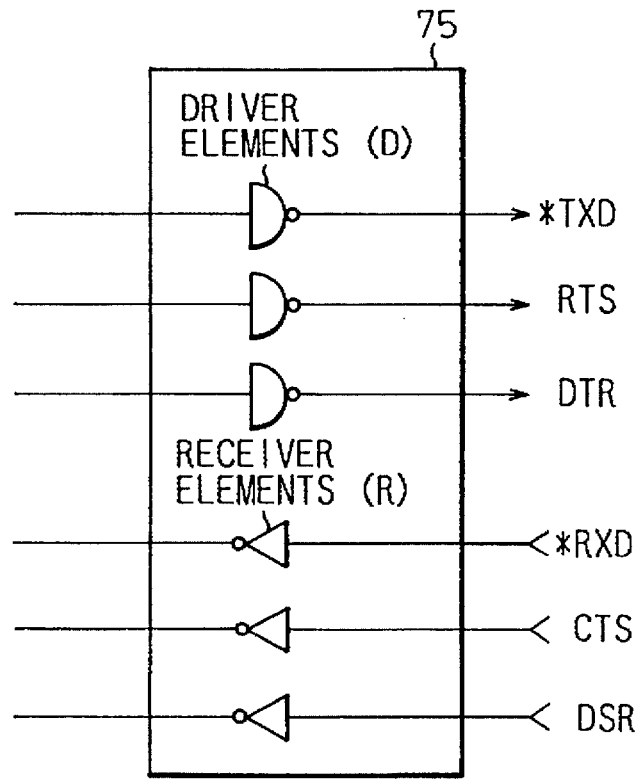
FIG. 6 shows some examples of a control interface for control signals.
Figure 7:
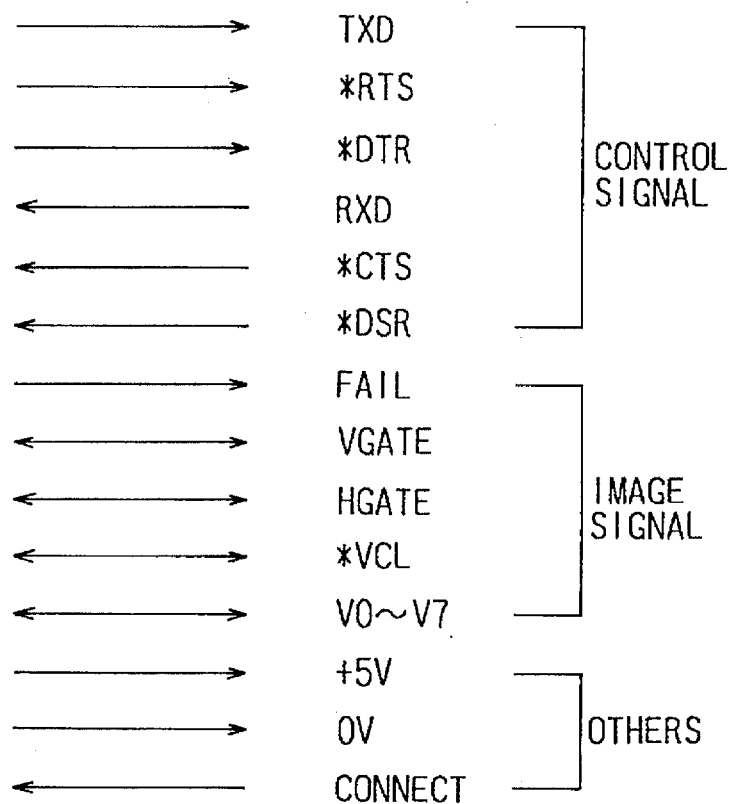
FIG. 7 shows an interface between a control circuit and an extended slot.

FIG. 5 shows some examples of the video interface for image signals, FIG. 6 shows some examples of the control interface for control signals, and FIG. 7 shows the interface between the control circuit 72 and the extended slot 38.

In FIG. 5, the signals "FAIL", "VGATE", "HGATE", "VCL" and "V0" to "V7" represent the video interface between the host computer and the image control unit, and the symbol "*" indicates negative logic. The signal FAIL represents an abnormal state of the image scanner, the signal VGATE represents the validity of video data in the sub-scanning direction (i.e., the direction which is perpendicular to main scanning direction of the CCD image sensor 60), the signal HGATE represents the validity of the video data at the main scanning direction, the signals V0 to V7 represent the eight bits of video data, and the signal VCL represents the sampling clock of the video data V0 to V7. Further, in the driver 74, the symbol "D" represents a driver element.

In FIG. 6, the signal "TXD" represents control data to be sent to the host computer, the signal "RTS" represents a sending request signal which requests the control data from the host computer, the signal "DTR" represents a ready state of its own image scanner. These signals are sent to the host computer through the driver element. The symbol "R" represents a receiver element.

In FIG. 7, the interface between the control circuit 72 and the extended slot 38 includes the control signal (TXD, *RTS, *DTR, RXD, *CTS, and *DSR), the image signal (FAIL, VGATE, HGATE, *VCL, and V0–V7), and others (+5, 0(V), and CONNECT).

The signal "RXD" represents the control data from the host computer, the signal "CTS" represents an acknowledge signal for the sending request signal RTS from the host computer, the signal "DSR" represents a ready state of the host computer. These signals are sent from the host computer to the image scanner through the receiver elements.

Figure 8:
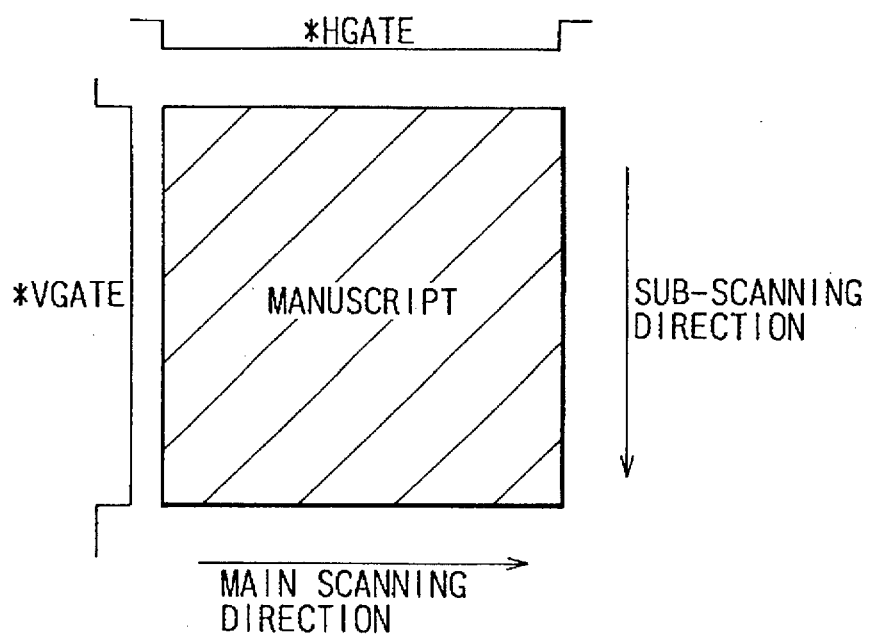
FIG. 8 is an explanatory view for explaining a main scanning direction and a sub-scanning direction.
Figure 9:
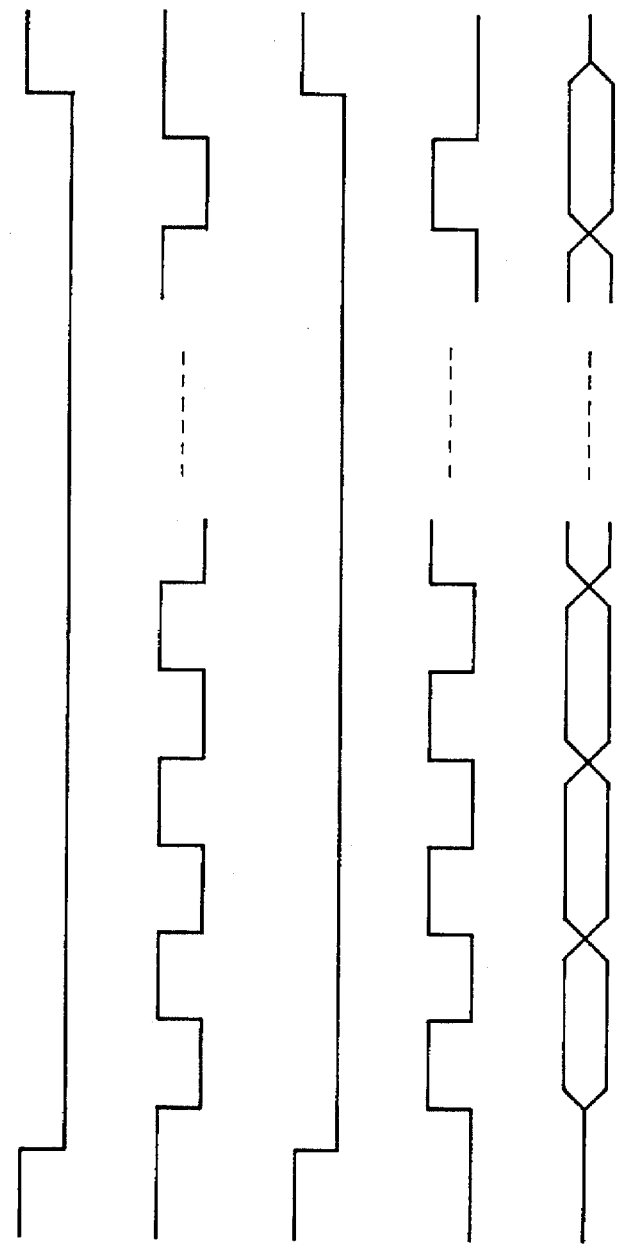
FIGS. 9A to 9E are timing charts of the video interface.
Figure 10:
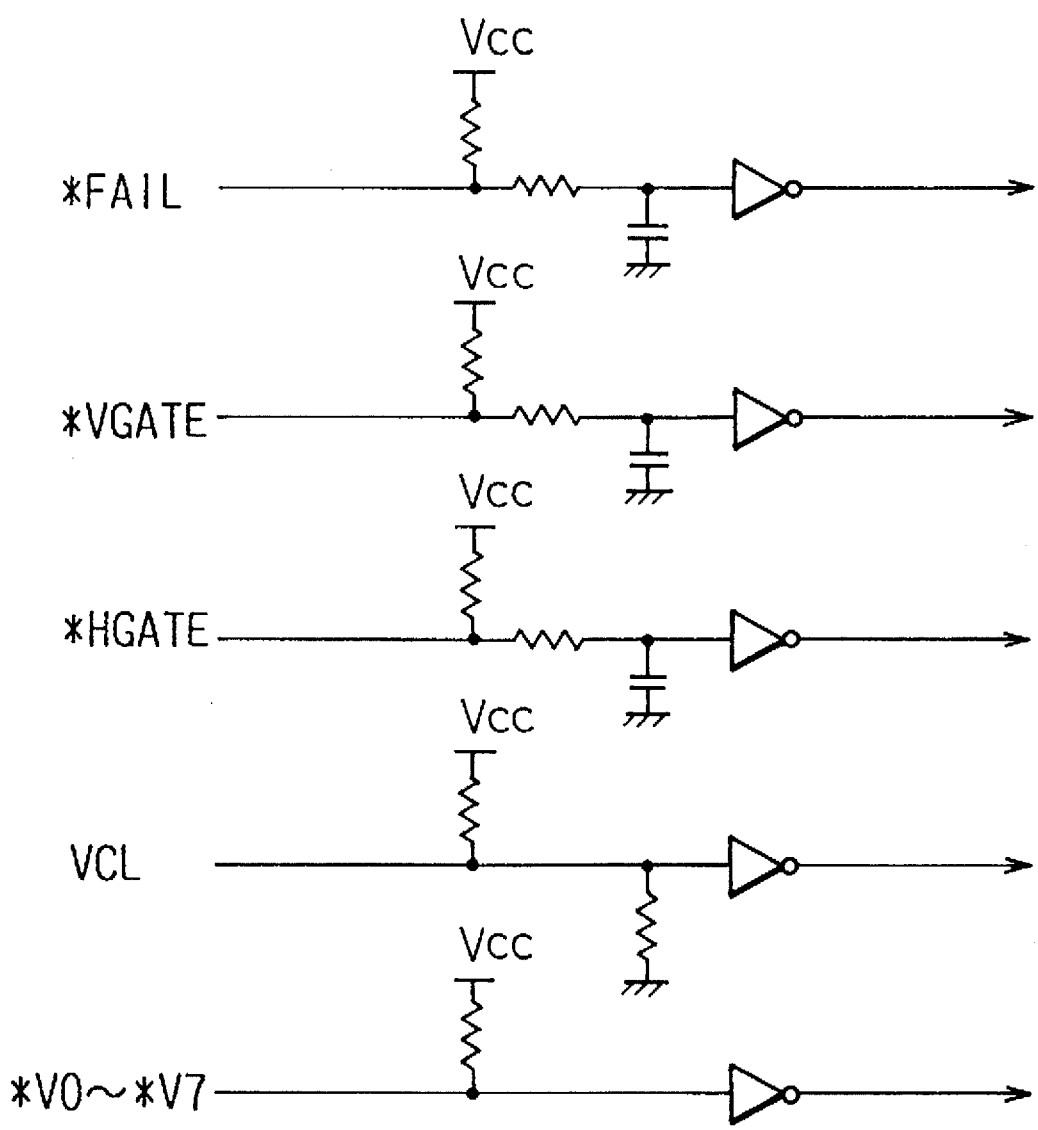
FIG. 10 is a detailed circuit of a receiver of FIG. 5.

FIG. 8 is an explanatory view for explaining the main scanning direction and the sub-scanning direction, FIGS. 9A to 9E are timing charts of the video interface, and FIG. 10 is a detailed circuit of the receiver of FIG. 5. As explained above, the signal VGATE represents the validity of video data at the sub-scanning direction, and the signal HGATE represents validity of the video data at the main-scanning direction. In the drawing, the symbol "*" indicates negative logic.

In FIGS. 9A to 9E, the eight bits of video data V0 to V7 are output from the driver 74 in response to the clock VCL. The video data V0 to V7 are formed as eight pixels data when they are binalized, and formed as one pixel data when they are not binalized.

Through the control interface, the host computer generates various control signals including initialization of the mechanism, read size and density of the manuscript, situation of mechanism, FB or ADF type, etc., to the image control unit 34.

The control circuit 72 sends the image signal to the extended slot 38 through the extended connector 42 without passing through the driver 74, and sends or receives the control signal to/from the extended slot 38 through the extended connector 42 without passing through the driver/receiver 75. As shown by arrows in FIG. 7, the signals TXD, RTS and DTR are sent from the control unit to the host computer, and the signals RXD, CTS and DSR are sent from the host computer to the control unit. Further, the signal FAIL is sent from the control unit to the host computer. Still further, signals VGATE, HGATE, *VCL and V0 to V7 are sent or received between the control unit and the host computer.

When the control circuit 72 detects a connection of the extended slot 38 to the connector 42 in accordance with the connection signal (CONNECT) from the extended slot, the control circuit 72 sets the control signal, which is not passed through the driver/receiver, to the valid state through the connector 22. As another embodiment, both connectors 21 and 22 become valid and the control circuit 72 sets the control signal to the valid state using a predetermined program.

When the image signal passes through the driver 74, a transfer rate per one byte is limited to, for example, 0.8 µs, in a conventional art. Further, when the control signal passes through the driver/receiver 75, a transfer rate per one byte is limited to, for example, 100 µs in the conventional art. However, according to the present invention, since the extended slot 38 is directly connected to the control unit 34 without passing through the driver 74 and driver/receiver 75, it is possible to use the control signal without any limitation.

Figure 11A:
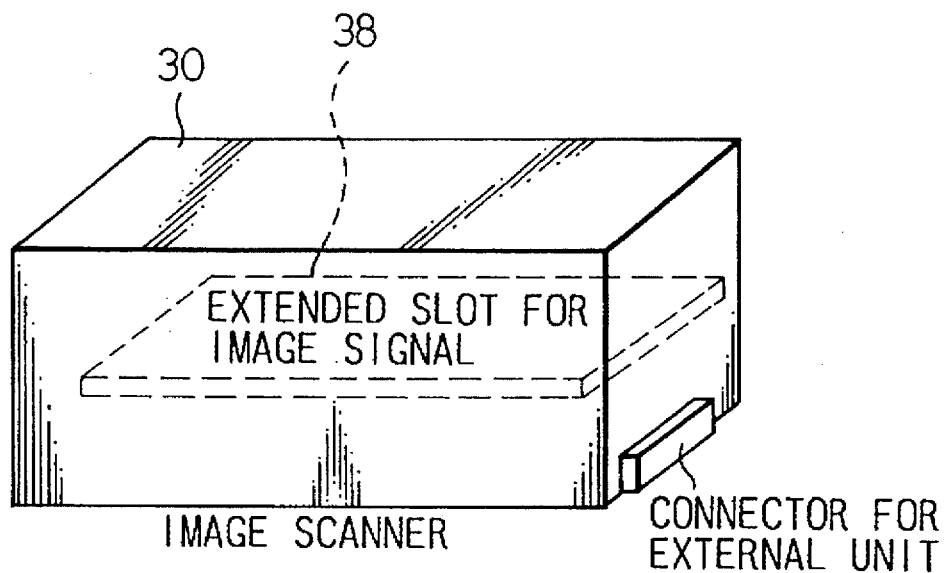
FIG. 11A and 11B are explanatory views for explaining connection to an external unit.
Figure 11B:
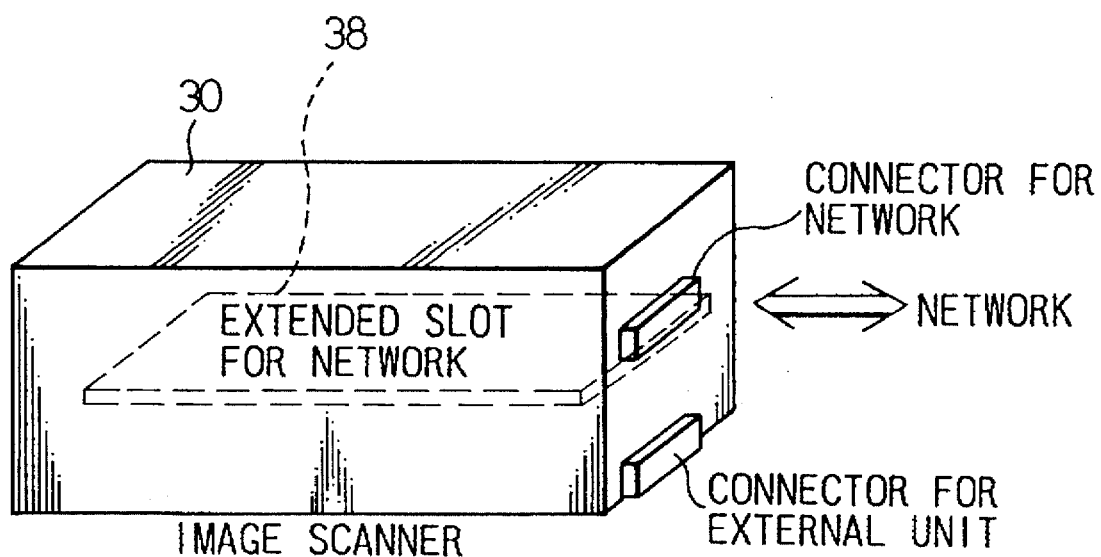

FIGS. 11A and 11B are explanatory views for explaining the connection to the external stage. In FIG. 11A, a connector for an external unit includes the connectors 40, 41 and 42 of FIG. 2. That is, when the user wishes to obtain an image signal processed by a new signal process which is not included in the image scanner, the extended slot 38 is connected to the extended connector 42 (see FIG. 2). Further, the image signal of the extended slot 38 is returned to the control circuit 72 and output to the video connector 40 and the control connector 41 through the driver 74 and the driver/receiver 75.

In FIG. 11B, the connector for the external unit includes the video connector 40 and the control connector 41, and a connector for an external network includes the extended connector 42. That is, when the user wishes to connect an external network which cannot be connected to the video/control interface of the image scanner 30, the extended slot 38 is connected to the extended connector 42 (see FIG. 2).

As explained in FIG. 4, as the image signal from the extended connector 42 to the extended slot 38 is not passed through the driver 74, it is possible to easily perform the image processing which is required by the user without any limitation by the driver 74. In this case, when a high speed processing is required by the user, the video interface is used. On the contrary, when the high speed processing is not required by the user, the control interface is used.

Further, as the control signal from the extended connector 42 to the extended slot 38 is not passed through the driver/receiver 75, it is possible to easily perform the connection to a network which is required by the user without any limitation by the driver/receiver 75.

Figure 12:
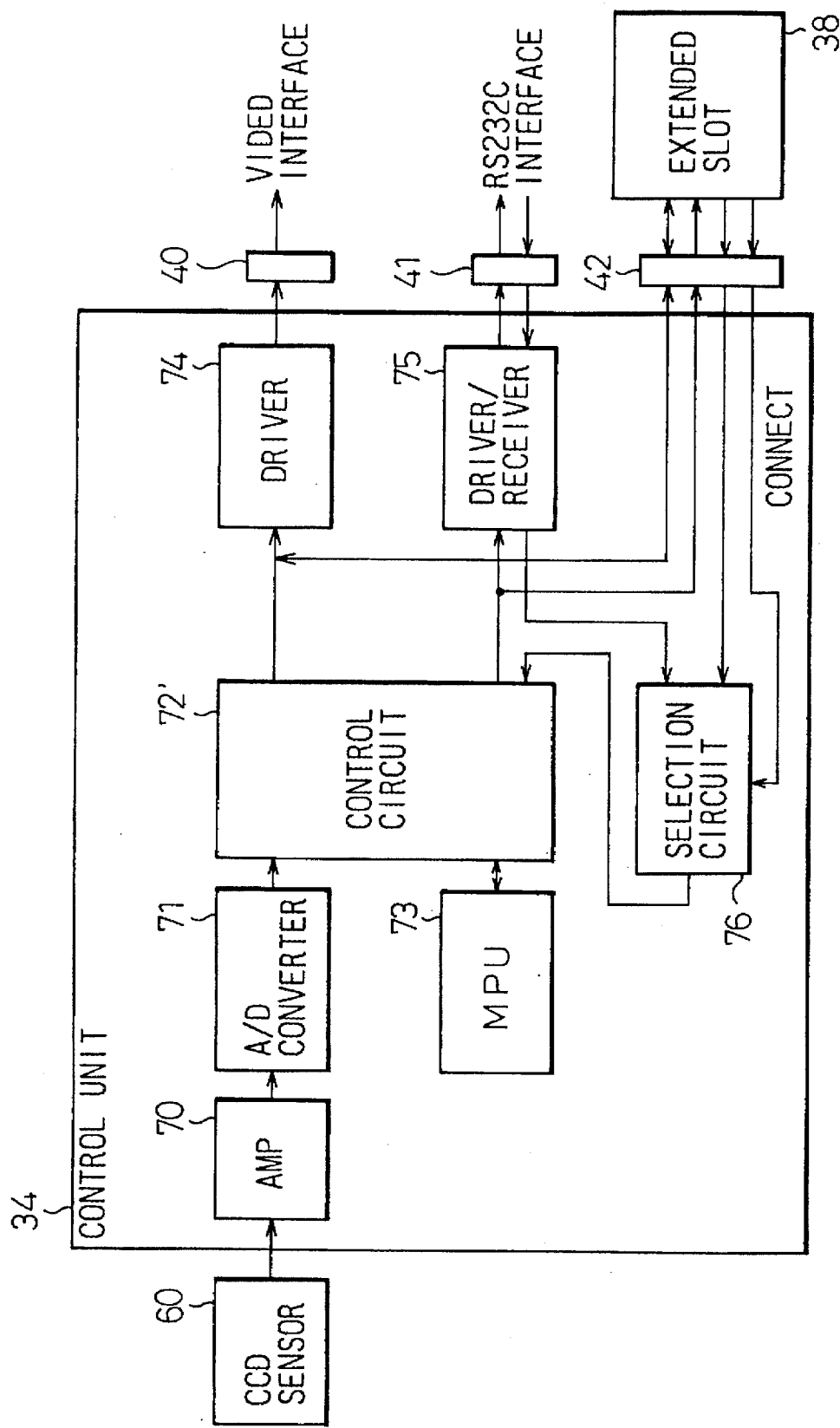
FIG. 12 is a detailed block diagram of the control unit as another example.
Figure 13A:
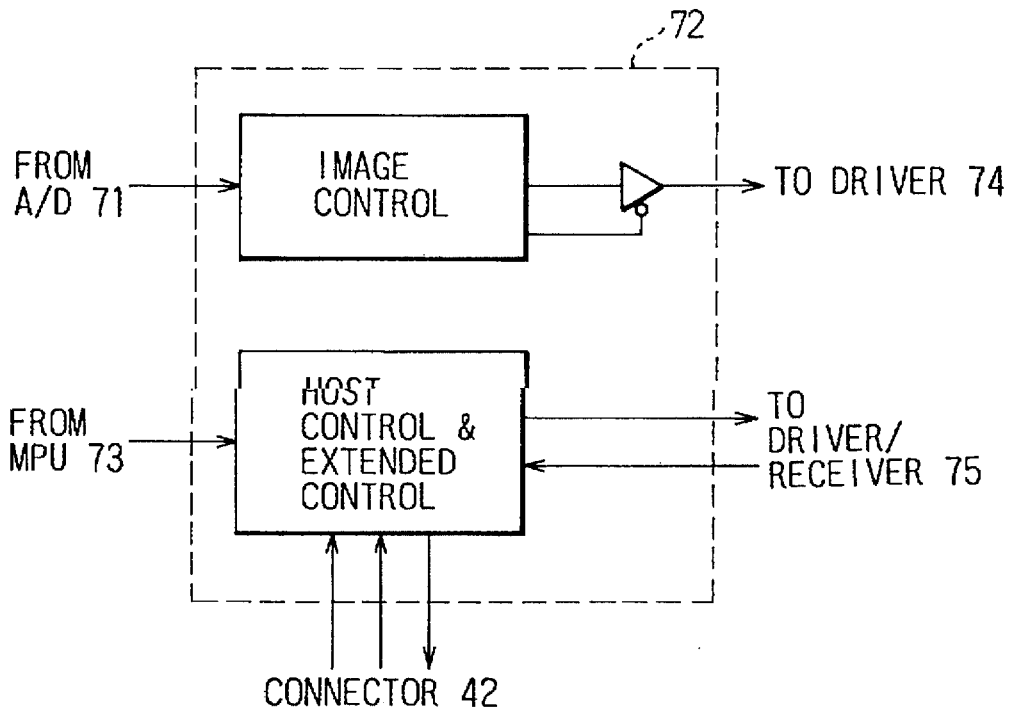
FIG. 13A is a detailed block diagram of the control circuit shown in FIG. 4.
Figure 13B:
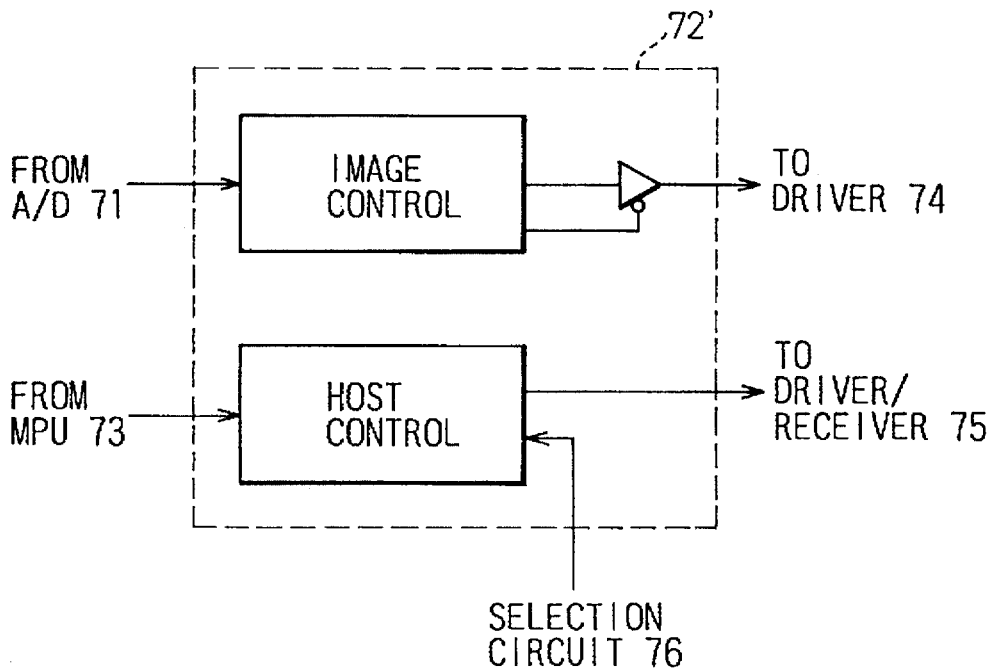
FIG. 13B is a detailed block diagram of the control circuit shown in FIG. 12.

FIG. 12 is a detailed block diagram of the image control unit 34 as another example, and FIG. 13B is a detailed block diagram of the control circuit 72' shown in FIG. 12. As shown in the drawing, a selection circuit 76 is provided for preventing a collision of the control signals. The control circuit 72' includes an image control portion and a host control portion. The image control portion receives the output of the A/D converter 71 and outputs the image signal to the driver 74 through a tri-state element. The host control portion receives the output of the microprocessor 73 and outputs the control signal to the driver/receiver 75 as explained below.

That is, the control signal is directly connected from the control circuit 72' to the driver/receiver 75 as a first route, and is returned from the driver/receiver 75 through the selection circuit 76 as a second route. That is, the control circuit 72' receives the control signal either through the driver/receiver 75 or through the extended connector 42. In this case, when the extended slot 38 is not connected to the extended connector 42, the first route is selected. On the other hand, when the extended slot 38 is connected to the extended connector 42, the second route is selected. Accordingly, it is possible to prevent collision of the control signals since the control signal can select one of two routes in accordance with connection of the extended slot 38.

FIG. 13A is a detailed block diagram of the control circuit 72 shown in FIG. 4. The control circuit 72 includes an image control portion and a host control/extended control portion. The image control portion receives the output of the A/D converter 71 and outputs the image signal to the driver 74 through the tri-state element. The host control/extended control portion receives the output of the micro processor 73 and receives/outputs the control signal from/to the driver/receiver 75.

As shown in the drawing, the control signal is directly sent/received to/from the driver/receiver 75. The connect signals CONNECT are provided from the extended connector 42 to the host control/extended control portion. That is, there are two routes for the control signal, i.e., one (first route) is provided through the driver/receiver 75, and the other (second route) is provided through the extended connector 42 without passing through the driver/receiver 75. When the extended slot 38 is connected to the extended connector 42, the second route is selected by the predetermined program.

The following explanations are given to the second aspect of the present invention. The second aspect of the present invention relates to the correction method for the difference of the image output between the FB type and the ADF type so as to eliminate the difference for every image scanner.

Figure 14:
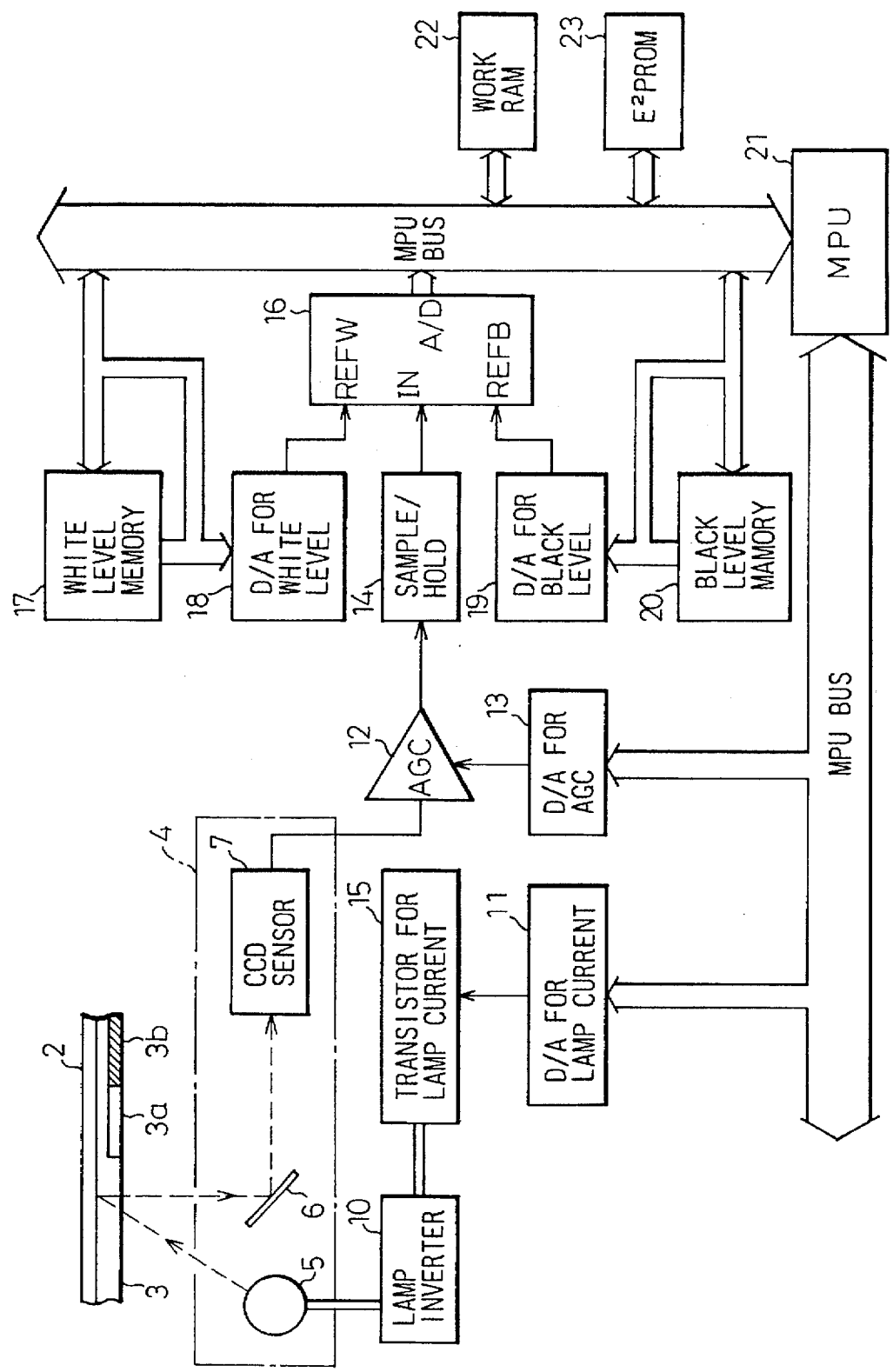
FIG. 14 is a basic block diagram of an image scanner using the present invention.
Figure 15A:
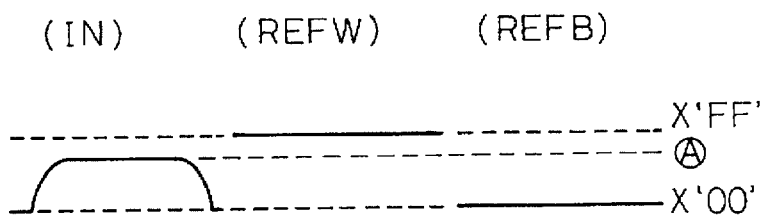
FIGS. 15A to 15F are explanatory views for explaining normal read sequence from the manuscript in use of an AGC amplifier.
Figure 15B:
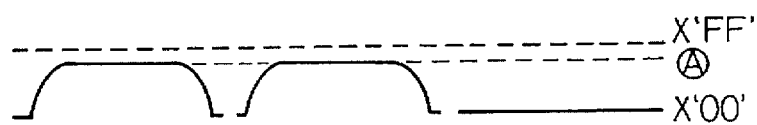
Figure 15C:
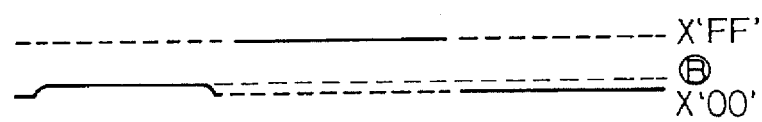
Figure 15D:
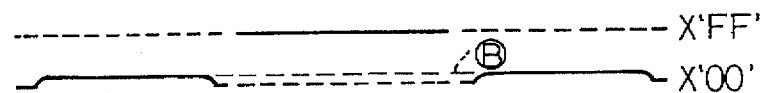
Figure 15E:
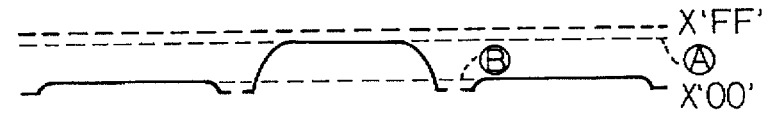
Figure 15F:
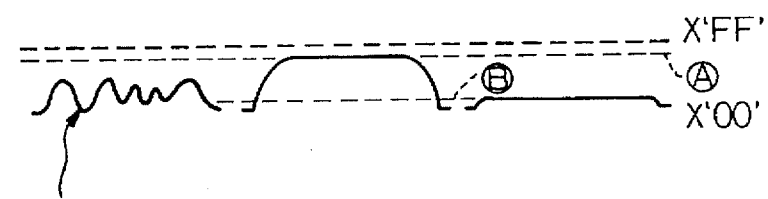

FIG. 14 is a basic block diagram of an image scanner using the present invention. In FIG. 14, reference number 2 denotes a manuscript to be read, 3 a glass plate, 3a a white reference portion, 3b a black reference portion, 4 an image read unit, 5 a lamp, 6 a mirror, and 7 a CCD (charge coupled device) image sensor. Reference numbers 8, 8', 9 and 9' are explained in FIG. 16B.

Reference 10 denotes a lamp inverter, 11 a D/A converter for controlling tube current to the lamp, 12 an automatic gain control (AGC) amplifier, 13 a D/A converter for a gain control of the AGC amplifier, 14 a sample-hold circuit, 15 a transistor for controlling the tube current to the lamp, 16 an A/D converter, 17 a memory for storing white level (below, white level memory), 18 a D/A converter for converting white level (white level D/A converter), 19 a D/A converter for converting black level (black level D/A converter), 20 a memory for storing black level (below, black level memory), 21 a microprocessor, 22 a work memory, and 23 an electrically erasable programmable read only memory ($E^2$PROM).

The manuscript 2 is put on the glass plate 3 in the FB type. The white reference portion 3a and the black reference portion 3b are provided inside of the glass plate 3. The lamp 5, the mirror 6 and the CCD sensor 7 are provided in the image read unit 4 which can move freely leftward and rightward under the glass plate 3.

The light irradiated from the lamp 5 is reflected by the rear surfaces of the manuscript 2 or the glass plate 3, and the reflected light is transferred to the CCD image sensor 7 through the mirror 6 (see dotted line). The lamp inverter 10 is provided for converting the DC current to the AC current so that it is possible to obtain the AC current which is set by the microprocessor 21. The setting AC current from the lamp inverter 10 is supplied to the lamp 5, and the setting AC current is informed from the microprocessor 21 through the D/A converter 11 for the lamp current and the transistor 15 for the lamp current.

The output of the CCD image sensor 7 is supplied to the AGC amplifier 12. The gain of the AGC amplifier 12 is controlled by the D/A converter 13 of which output voltage is adjusted by the microprocessor 21. The output of the AGC amplifier 12 is supplied to an input terminal IN of the A/D converter 16 after a sample-hold operation by the sample-hold circuit 14.

The A/D converter 16 has the input terminal IN, a terminal for white reference level (below, white reference terminal) REFW, and a terminal for black reference level (below, black reference terminal) REFB. The output of the white level D/A converter 18 is input to the white reference terminal REFW, and the output of the black level D/A converter 19 is input to the black reference terminal REFB. The white level memory 17 can store image data for one line, and the black level memory 20 also can store image data for one line. As shown in the drawing, the read data from the white level memory 17 is input to the white level D/A converter 18, and the read data from the black level memory 20 is input to the black level D/A converter 19.

The microprocessor 21 can control the output of the D/A converter 11 for the tube current of the lamp, the output of the D/A converter 13 for the gain control of the AGC amplifier 12, the read/write operations for the white level memory 17 and the black level memory 20, the output of the A/D converter 16, and the read/write operation for the work RAM and $E^2$PROM through MPU buses.

FIGS. 15A to 15F are explanatory views for explaining a normal read sequence from the manuscript 2 and use of the AGC amplifier. In the drawing, "IN" corresponds to the terminal IN, "REFW" corresponds to the terminal REFW and "REFB" correspond to the terminal REFB in the A/D converter 16. Further, X"FF" corresponds to the white reference level and X"00" corresponds to the black reference level. Still further, "LW" represents the white level, and "LB" represents the black level.

First, the image read unit 4 is moved to the white reference portion 3a in order to read the white reference level. Next, the gain of the AGC amplifier 12 is adjusted by the following manners. That is first, the white level X"FF" (for example, 255) is input from the white level memory 17 to the white level D/A converter 18. Next, the black level (for example, 0) is input from the black level memory 20 to the black level D/A converter 19. Further, the gain of the AGC amplifier 12 is adjusted in such a way that the output of the A/D converter 16 becomes larger than "0" and smaller than "255". After the gain of the AGC amplifier 12 is adjusted based on the above processes, the output of the A/D converter 16 is sequentially written into the white level memory 17 through the MPU bus.

After the white reference data are written into the white level memory 17, first, the image read unit 4 is moved to the black reference portion 3b in order to read the black reference level. Next, the output of the A/D converter 16 is sequentially written into the black level memory 20. After the black reference data is written into the black level memory 20, the read data of the white level memory 17 is input to the white level D/A converter 18, and the read data of the black level memory 20 is input to the black level D/A converter 19. The read operation for the manuscript is started after the above processes are completed.

In the read operation for the manuscript, when the image signal of the i-th bit of the CCD image sensor 7 is input to the terminal IN of the A/D converter 16, the i-th white reference data of the white level memory 17 is input to the white level D/A converter 18, and the i-th black reference data of the black level memory 20 is input to the black level D/A converter 19.

In the above explanation, although the gain of the AGC amplifier 12 is adjusted so as to match an input range of the A/D converter 16, it is possible to adjust an amount of the lamp 5 so as to match an input range of the A/D converter 16 instead of gain adjustment.

Figure 16A:
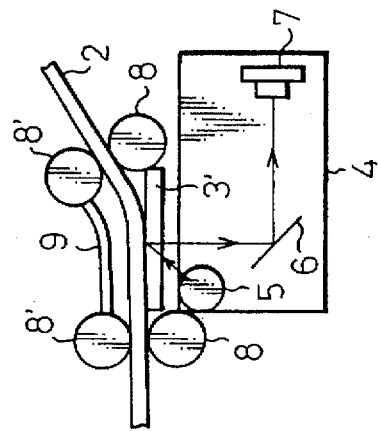
FIG. 16A shows a basic structure of the image read unit of a FB type.
Figure 16B:
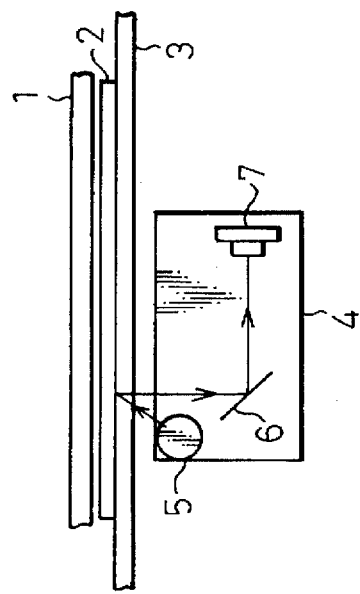
FIG. 16B shows a basic structure of the image read unit of an ADF type.
Figure 16C:
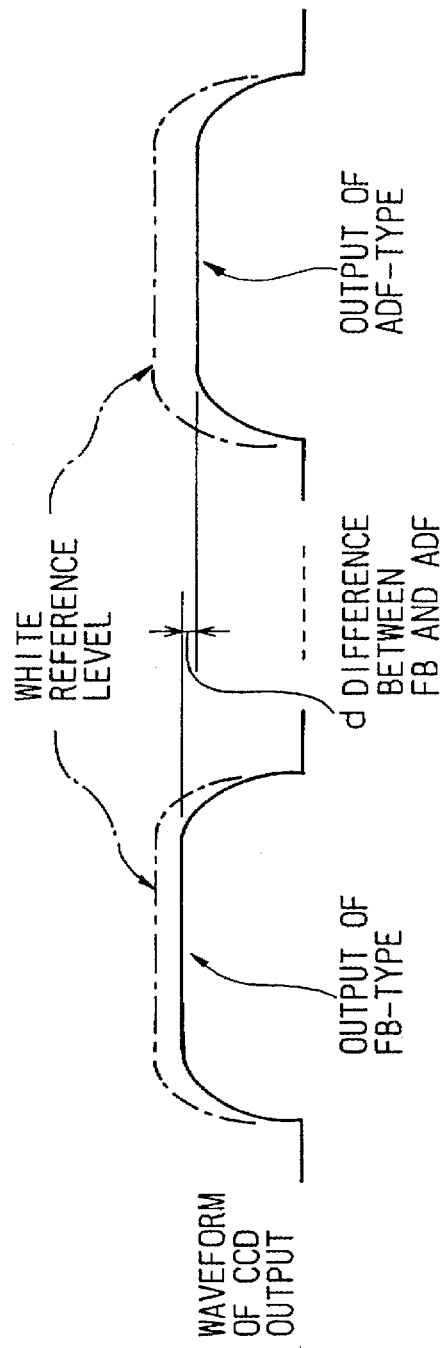
FIG. 16C is an explanatory view of the difference of an image output between the FB type and the ADF type.

FIGS. 16A to 16C are explanatory views for explaining a difference of gradation (i.e., a difference of the image output level) between the FB type and the ADF type image scanner. That is, FIG. 16A shows a basic structure of the image read unit of the FB type image scanner, and FIG. 16B shows a basic structure of the image read unit of the ADF type image scanner. Further, FIG. 16C is an explanatory view of the difference of the image output between the FB type and the ADF type.

In FIGS. 16A and 16B, reference 1 denotes a covering member for the manuscript, 3' a glass plate, 8 a drive roller, 8' a sub-drive roller, and 9 a guide member. The same reference numbers as in previous drawings are attached to the same components. In the image scanner using the present invention, it is possible to read the manuscript using both the FB type and the ADF type by using only one image read unit 4.

In FIG. 16A, in the read operation using the FB type, the manuscript 2 is put on the glass plate 3 and the image read unit 4 is moved from the left to the right.

In FIG. 16B, the sub-rollers 8' are provided to both end of the guide member 9. In the ADF type, the image read unit 4 is fixedly provided to the left end of the glass plate 3'. The manuscript 2 is inserted between the drive roller 8 and the sub-drive roller 8'. When the drive roller 8 is rotated in the counterclockwise direction, the manuscript is transferred to the left. The light from the lamp 5 is reflected from the rear surface of the manuscript 2, and the reflected light is transferred to the CCD image sensor 7 through the mirror 6.

In FIG. 16C, the chain dotted lines show the white reference level. In this case, the left solid line shows the output level of the FB type, and the right solid line shows the output level of the ADF type at the A/D converter 16. Further, the ordinate represents the image output level, and the abscissa represents the time (i.e., distance along the CCD image sensor from one end thereof).

As is obvious, there is a difference of gradation "d" (i.e., difference of output level) between the FB type and the ADF type. This difference "d" is caused by various factors, for example, the amount of the light reflected from the manuscript, the reflectance ratio of the covering member 1 of the FB type, the gap between the manuscript and the glass plate at the ADF type, the influence of peripheral light, etc.

In the image scanner which includes the FB type and ADF type, it is necessary to eliminate the difference "d" in order to obtain a high-quality output image.

In order to eliminate the difference "d" between the FB type and the ADF type, the following two methods, i.e., mechanical and electrical methods, are known in a conventional art.

As the mechanical method, (1) in the ADF type, one method is to set the gap between the glass plate 3' and the sub-drive roller 8' as narrow as possible in order to avoid separating the manuscript 2 and the glass plate 3, and (2) in the ADF type, another method is to provide the more width (in the left and right direction) along the glass plate 3' in order to obtain better contact between the glass plate 3' and the manuscript 2 so that the amount of the peripheral light at the read position is the same as that in the FB type.

However, the above two methods have the following problems. For item (1), when the gap between the glass plate 3' and the sub-drive roller 8' is reduced, the thickness of a paper which can be used as the manuscript 2 is limited in order to ensure smooth movement of the paper. For item (2), when the size of the glass plate becomes large, the cost of the image scanner increases. Further, since the movement time for the paper becomes longer, the feeding efficiency of the paper becomes worse.

On the other hand, as the electrical method, one method is to check the difference "d" of the output level between the ADF type and the FB type regarding some image scanners, to obtain an average value of the difference of the gradation, and to determine the correction value (%) of the white reference value of the ADF type. Further, in the read operation using the ADF type, the above average value is applied to all image scanners, and the white reference level is changed in accordance with the average value in order to eliminate the difference of the image output between the FB type and the ADF type.

However, in the above electrical method, since the white reference levels for all image scanners are uniformly adjusted to the predetermined correction value, it is difficult to correct a large difference exceeding the average value.

The second aspect of the present invention aims to eliminate a difference in the image output between the ADF type and the FB type image scanner.

As shown in FIG. 14, the image scanner using the second aspect of the present invention includes: the lamp 5 for irradiating light onto a manuscript 2; the CCD image sensor (7); the AGC amplifier (12) for amplifying the output of the CCD image sensor and controlling the gain thereof by controlling the output voltage of the D/A converter (13) which is controlled by the microprocessor (21); the white level memory (17) for storing the white reference level which is obtained by reading the white reference portion (3a); the white level D/A converter (18) for converting the analog white reference level signal, which is read from the white level memory (17), to the digital signal; the black level memory (20) for storing the black reference level which is obtained by reading the black reference portion (3b); the black level D/A converter (19) for converting the analog black reference level signal, which is read from the black level memory (20), to the digital signal; and the A/D converter (16) having the input terminal (IN) for receiving the analog signal from the amplifying/sample-hold units (12, 14, 13), the white reference terminal (REFW) for receiving the output from the D/A converter (18), and the black reference terminal (REFB) for receiving the output from the D/A converter (19), and outputting the digital signal.

In the above structure, the lamp (5), the mirror (6) and the CCD image sensor (7) structure the image read unit (4) which is used commonly in the FB type and the ADF type.

According to a first embodiment of a correction method for correcting the difference of the image output (i.e., difference of the gradation) between the FB type and the ADF type, the correction method uses the following steps.

First, the image read unit (4) of the FB type reads a reference manuscript having uniform reflectance ratio, and a first output of the A/D converter (16) is stored in the work RAM (22).

Next, the image read unit (4) of the ADF type reads the same reference manuscript and outputs a second output from the A/D converter (16). Further, the level of the white reference level signal at the white reference terminal (REFW) of the A/D converter (16) is adjusted by controlling the D/A converter (13) which is controlled by the microprocessor (21) so that the second output becomes equal to the first output, and a change rate of the white reference level signal is stored in the E²PROM (23) when the first output is equal to the second output.

Finally, when the image read unit (4) reads the manuscript by using the ADF type, the output from the white level D/A converter (18) is changed in accordance with the change rate which is stored in the E²PROM (23).

According to a second embodiment of the correction method, the second method used the following steps.

First, the image read unit (4) of the FB type reads the reference manuscript having a uniform reflectance ratio, and the first output of the A/D converter (16) is stored in the work RAM (22).

Next, the image read unit (4) of the ADF type reads the same reference manuscript and outputs the second output from the A/D converter (16). Further, the gain of the amplifier and sample-hold units (12, 14, 13) is adjusted by controlling the D/A converter (13) which is controlled by the microprocessor (21) so that the second output becomes equal to the first output, and the change rate of the gain is stored in the E²PROM (23) when the first output is equal to the second output.

Finally, when the image read unit reads the manuscript by using the ADF type, the gains of the amplifier and sample-hold units (12, 14, 13) are changed in accordance with the change rate which is stored in the E²PROM (23).

According to a third embodiment of the correction method, the third method uses the following steps.

First, the image read unit (4) of the FB type reads the reference manuscript having a uniform reflectance ratio, and the first output of the A/D converter (16) is stored in the work RAM (22).

Next, the image read unit (4) of the ADF type reads the same reference manuscript and outputs the second output from the A/D converter (16). Further, the tube current of the lamp (5) is adjusted by controlling the D/A converter (11) which is controlled by the microprocessor (21) so that the second output becomes equal to the first output, and the change rate of the tube current is stored in the E²PROM (23) when the first output is equal to the second output.

Finally, when the image read unit reads the manuscript by using the ADF type, the tube current of the lamp (5) is changed in accordance with the change rate which is stored in the E²PROM (23).

According to a fourth embodiment of the correction method, the forth method uses the following steps.

First, the image read unit (4) of the FB type reads the reference manuscript having uniform reflectance ratio, and the first output of the A/D converter (16) is stored in the work RAM (22).

Next, the image read unit (4) of the ADF type reads the same reference manuscript and outputs the second output from the A/D converter (16). Further, in accordance with the first and second outputs, a conversion formula is generated so that the first output becomes equal to the second output, and the resultant formula is stored in the E²PROM (23).

Finally, when the image read unit reads the manuscript by using the ADF type, the output of the A/D converter is changed in accordance with the resultant formula which is stored in the E²PROM (23) by using the microprocessor.

In the case of the above first embodiment, for example, it is assumed that the input level of the white reference signal at the white reference terminal (REFW) is given to "100", and the input level of the black reference signal at the black reference terminal (REFB) is given to "0". Under the above condition, it is assumed that the first output of the A/D converter (16) when the manuscript 2 is read by the FB type is given to "50", and the second output of the A/D converter (16) when the manuscript 2 is read by the ADF type is given to "40".

In this case, since the first output and the second output are different from each other, the input level of the white reference signal which is input to the A/D converter (16) by the ADF type is adjusted. That is, if the output of the A/D converter (16) becomes "50" when the level of the white reference signal is given to in the ADF type, the change rate (i.e., 80/100) is stored in the E²PROM (23). After above steps, the input level of the white reference signal at the A/D converter (16) in the normal read operation by the ADF type is adjusted to "80/100" of the input level of the white reference signal in the normal read operation by the FB type.

In the case of the second embodiment, for example, although the same conditions as the first embodiment are given, it is assumed that the input level of the white reference signal at the white reference terminal (REFW) is given to "100", and the input level of the black reference signal at the black reference terminal (REFB) is given to "0". Under the above condition, it is assumed that the first output of the A/D converter (16) when the manuscript 2 is read by the FB type is given to "50", and the second output of the A/D converter (16) when the manuscript 2 is read by the ADF type is given "40".

In this case, since the first output and the second output are different from each other, the gain of the amplifier and sample-hold units is adjusted when the manuscript is read by the ADF type. That is, if the output of the A/D converter becomes "50" when the gain of the amplifier and sample-hold units at the ADF type is given to "50/40" of the gain of the amplifier and sample-hold units at the FB type, the change rate (i.e., 50/40) is stored in the E²PROM (23). After above steps, the gain of the amplifier and sample-hold units at the normal read operation by the ADF type is given to "50/40" of the gain of the amplifier and sample-hold units at the normal read operation by the FB type.

In the case of the third embodiment, for example, although the same conditions as the second embodiment are given, it is assumed that the input level of the white reference signal at the white reference terminal (REFW) is given to "100", and the input level of the black reference signal at the black reference terminal (REFB) is given to "0". Under the above condition, it is assumed that the first output of the A/D converter (16) when the manuscript 2 is read by the FB type is given to "50", and the second output of the A/D converter (16) when the manuscript 2 is read by the ADF type is given to "40".

In this case, since the first output and the second output are different from each other, the tube current flowing in the lamp is adjusted. That is, if the output of the A/D converter (16) becomes "50" when the tube current of the lamp at the ADF type is given to "50/40" of the tube current at the FB type, the change rate (i.e., 50/40) is stored in the E²PROM (23). After above steps, in the normal read operation by the ADF type, the tube current of the lamp is given to "50/40" of the tube current in the normal read operation by the FB type.

In the case of the fourth embodiment, for example, although the same conditions as the third embodiment are given, it is assumed that the input level of the white reference signal at the white reference terminal (REFW) is given to "100", and the input level of the black reference signal at the black reference terminal (REFB) is given to "0". Under the above condition, it is assumed that the first output of the A/D converter (16) when the manuscript 2 is read by the FB type is given to "50", and the second output of the A/D converter (16) when the manuscript 2 is read by the ADF type is given to "40".

In this case, the conversion formula is generated in order to correct the output of the A/D converter (16) as follows.

$V_{ADF}$=an output of the A/D converter×50/40

Where, $V_{VDF}$ is a corrected output.

In the normal read operation by the ADF type, the output of the A/D converter is corrected based on the above conversion formula, and the resultant data is used as the image output from the A/D converter.

FIG. 17A is a waveform of the image output in the read operation by the FB type, and FIG. 17B is a read line on a reference paper of FIG. 17A. In FIG. 17A, a chain dotted line denotes the white reference level and the black reference level, and a solid line denotes the amplified output of the CCD image sensor (i.e., output from the sample-hold circuit 14, see, FIG. 14). On the black reference level, the first dot represents the first bit, the center dot represents the i-th bit, and the last dot represents the n-bit. Further, the point "A" denotes the level of the amplified output of the CCD image sensor at the i-th bit in the vicinity of the center of the paper. In FIG. 17B, the reference paper has a uniform reflectance ratio.

FIG. 18 is a detailed circuit diagram of the A/D converter 16 of FIG. 14. Reference numbers (22) denote comparators 1 to 256, and reference number 23 denotes a calculation circuit. The upper terminal corresponds to the terminal REFW in the A/D converter and used to input the white level, the center terminal corresponds to the terminal IN in the A/D converter and used to input the CCD output through the sample-hold circuit 14, and the lower terminal corresponds to the terminal REFB in the A/D converter and used to input the black level. Resistors R1 to Rn are connected in series between the terminal REFW and the terminal REFB.

As shown in the drawing, one input terminal of each comparator 22 is connected to a common node between adjacent resistors, and the other terminal of each comparator 22 is connected in common to the terminal IN of the CCD output. Accordingly, the levels at the terminals REFW or REFB are applied to one input terminal of each comparator through the resistors, and the amplified output of the CCD image sensor is directly applied to the other input terminal of each comparator 22. Further, each output of the comparators 22 is sent to the calculation circuit 23 which outputs the digital signals D0 to D7. These outputs correspond to the output of the A/D converter 16 of FIG. 14.

The outputs from the A/D converter 16 are determined in accordance with the number of the comparators 22 which are "ON". For example, when all outputs of the comparators 22 are "ON", the output of the A/D converter 16 becomes X"FF" (i.e., white reference level). On the other hand, when all the outputs of the comparators 22 are "OFF", the output of the A/D converter 16 becomes X"00" (i.e., black reference level). That is, for example, when the outputs from the first to the i-th (80-th) of the comparators 22 are "ON", the output of the A/D converter 16 becomes X"50".

As explained above, the present invention aims to eliminate the difference of the image output between the first output by the FB type and second output by the ADF type. In order to realize the above, there are four correction methods in the second aspect of the present invention, i.e., correction by means of the white reference level, correction by means of the CCD output, correction by means of an amount of the light by the lamp, and correction by means of the conversion formula calculated by the microprocessor.

These correction methods will be explained in detail with reference to the drawings.

Correction by means of the white reference level

Figure 19:
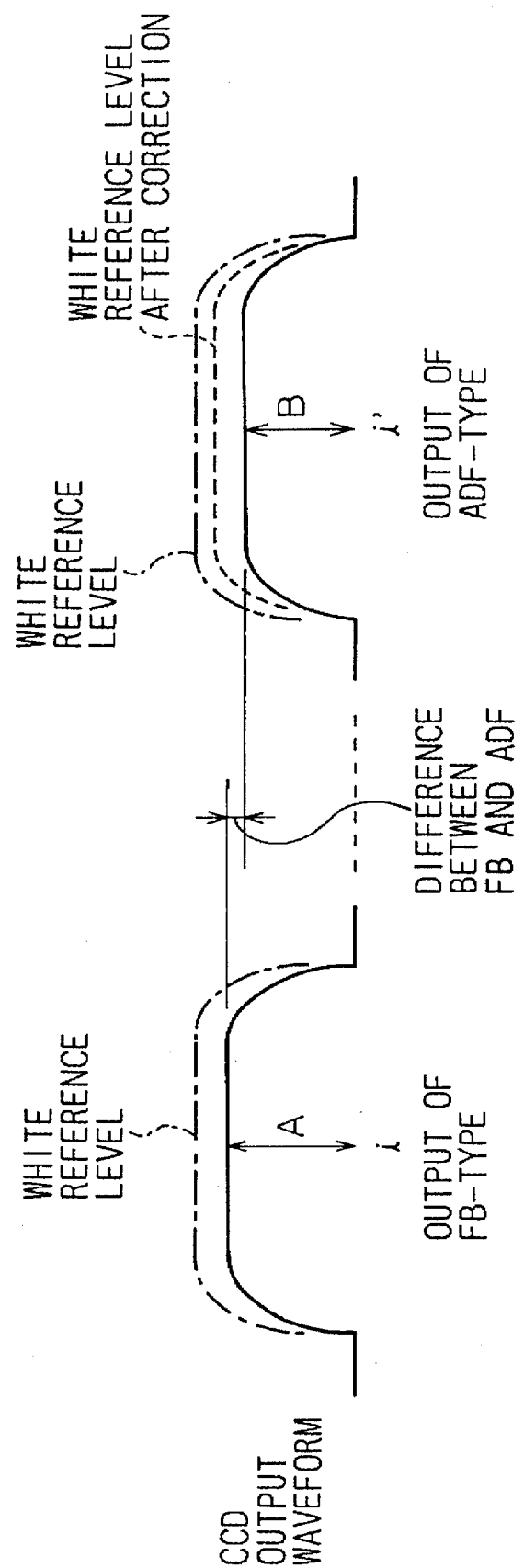
FIG. 19 is an explanatory view for explaining correction by means of a white reference level between the FB type and the ADF type.

FIG. 19 is an explanatory view for explaining correction by means of the white reference level between the FB type and the ADF type. In the drawing, the chain dotted line denotes the white reference level, and the dotted line denotes the white reference level after correction. Further, the left side denotes the image output by the FB type, and the right side denotes the image output by the ADF type. The correction by means of the white reference level is performed as follows.

(1) The image read unit (4) reads the white reference portion (3a), and the read data is adjusted to X"FF" by controlling the D/A converter (18) which is controlled by the microprocessor (21). Similarly, the read data is adjusted to X"00" by controlling the D/A converter (19) which is controlled by the microprocessor (21). Further, the microprocessor (21) controls the D/A converter (13) in order to adjust the gain of the AGC amplifier (12) so that the CCD output is included within the input range of the A/D converter (16).

(2) The image read unit (4) of the FB type reads the reference manuscript having a uniform reflectance ratio. The output level of the A/D converter (16) at the i-th bit is set to a level A. The level A is stored in the work RAM in accordance with the control by the microprocessor (21).

(3) The image read unit (4) of the ADF type reads the same reference manuscript. The output level of the A/D converter (16) at the i'-th bit (i=i') is set to a level B. The level B is stored in the work RAM in accordance with the control by the microprocessor (21).

(4) During read operation by the ADF type, movement of the manuscript is temporarily stopped in the vicinity of the center of the manuscript, the microprocessor (21) compares the level A with the level B and adjusts the white reference level of the D/A converter (18) until the level B is equal to the level A.

(5) The change rate of the white reference level is stored in the E²PROM (23) when the level B is equal to the level A under the control of the microprocessor (21).

(6) In the read operation by the ADF type after the above processes, the white reference level is stored in the white level memory (17), and the white reference level is corrected in accordance with the change rate stored in the E²PROM (23) by setting the change rate to the D/A converter (18) which is controlled by the microprocessor (21).

Correction by means of the CCD output

Figure 20:
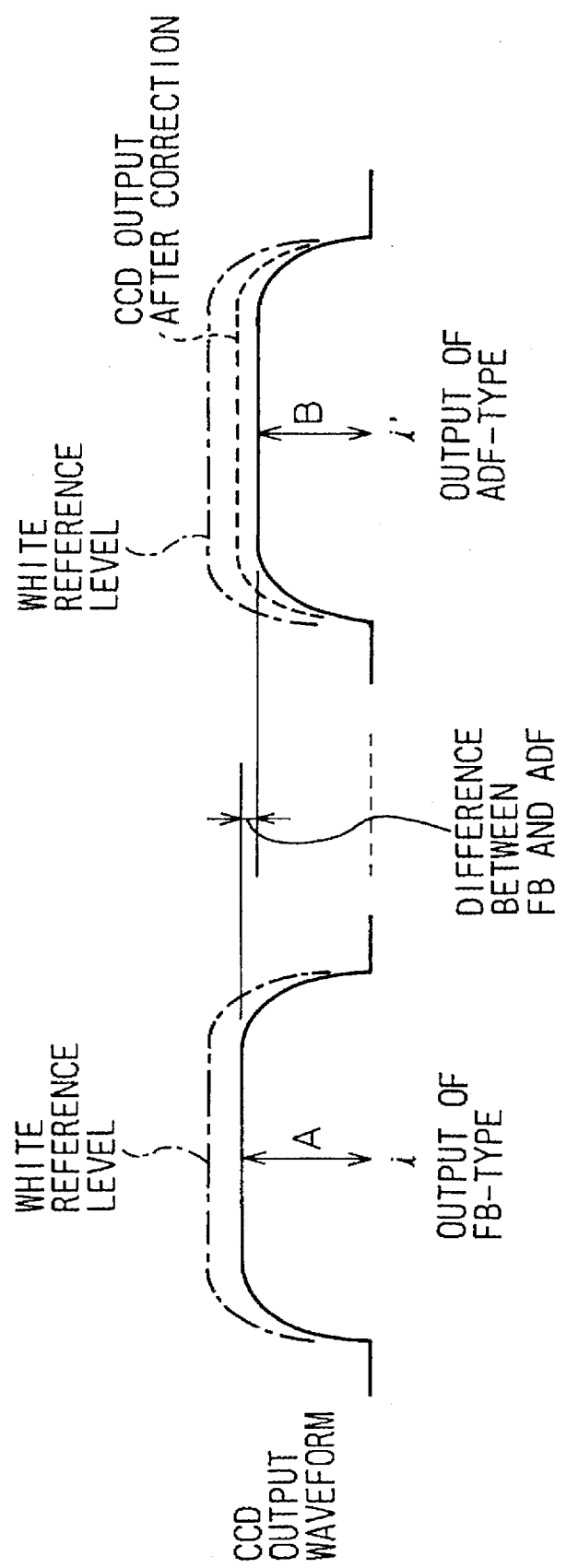
FIG. 20 is an explanatory view for explaining correction of a CCD output between the FB type and the ADF type.

FIG. 20 is an explanatory view for explaining the correction of the CCD output between the FB type and the ADF type. In the drawing, the chain dotted line represents the white reference level, and the dotted line represents the CCD output level after correction. The correction by means of the CCD output is performed as follows.

(1) The image read unit (4) reads the white reference portion (3a), and the read data is adjusted to X"FF" by controlling the D/A converter (18) which is controlled by the microprocessor (21). Similarly, the read data is adjusted to X"00" by controlling the D/A converter (19) which is controlled by the microprocessor (21). Further, the microprocessor (21) controls the D/A converter (13) in order to adjust the gain of the AGC amplifier (12) so that the CCD output is included within the input range of the A/D converter (16).

(2) The image read unit (4) of the FB type reads the reference manuscript having a uniform reflectance ratio. The output level of the A/D converter (16) at the i-th bit is set to a level A. The level A is stored in the work RAM in accordance with the control by the microprocessor (21).

(3) The image read unit (4) of the ADF type reads the same reference manuscript. The output level of the A/D converter 16 at the i'-th bit (i=i') is set to the level B. The level B is stored in the work RAM in accordance with the control by the microprocessor (21).

(4) During read operation by the ADF type, movement of the manuscript is temporarily stopped in the vicinity of the center of the manuscript, the microprocessor (21) compares the level A with the level B and adjusts the gain of the D/A converter (13) until the level B is equal to the level A.

(5) The change rate of the gain is stored in the E²PROM (23) when the level B is equal to the level A under the control by the microprocessor (21).

(6) In the read operation by the ADF type after the above processes, the white reference level is stored in the white level memory (17), and the gain is corrected in accordance with the change rate of the gain stored in the E²PROM (23) by setting the change rate to the D/A converter (13) which is controlled by the microprocessor (21).

Correction by means of the amount of light produced by the lamp

This correction is performed by adjusting the amount of the light produced by the lamp by controlling the D/A converter (11) and the transistor unit (15) under the control of the microprocessor (21). The correction by means of the amount of the light is performed as follows.

(1) The image read unit (4) reads the white reference portion (3a), and the read data is adjusted to X"FF" by controlling the D/A converter (18) which is controlled by the microprocessor (21). Similarly, the read data is adjusted to X"00" by controlling the D/A converter (19) which is controlled by the microprocessor (21). Further, the microprocessor (21) controls the D/A converter (13) in order to adjust the gain of the AGC amplifier (12) so that the CCD output is included within the input range of the A/D converter (16).

(2) The image read unit (4) of the FB type reads the reference manuscript having uniform reflectance ratio. The output level of the A/D converter (16) at the i-th bit is set to a level A. The level A is stored in the work RAM in accordance with the control by the microprocessor (21).

(3) The image read unit (4) of the ADF type reads the same reference manuscript. The output level of the A/D converter 16 at the i'-th bit (i=i') is set to the level B. The level B is stored in the work RAM in accordance with the control by the microprocessor (21).

(4) During read operation by the ADF type, movement of the manuscript is temporarily stopped in the vicinity of the center of the manuscript, the microprocessor (21) compares the level A with the level B and adjusts the amount of the light by controlling the transistor unit (15) and the D/A converter (11) under the control of the microprocessor (21) until the level B is equal to the level A.

(5) The change rate of the gain is stored in the E²PROM (23) when the level B is equal to the level A under the control of the microprocessor (21).

(6) In the read operation by the ADF type after the above processes, the white reference level is stored in the white level memory (17), and the amount of the light is corrected in accordance with the change rate stored in the E²PROM (23) by setting the change rate to the transistor unit (15) and the D/A converter (11) under the control of the microprocessor (21).

Correction by means of the conversion formula

The output of the A/D converter (16) is sent to the microprocessor (21), and the image output is corrected by using the change rate which is obtained by the correction of the white reference level or the correction of the CCD output.

For example, when the white reference level is "100" and the black reference level of the A/D converter (16) is "0", it is assumed that the first output is "50" when the manuscript is read by the FB type and the second output is "40" when the manuscript having the same reflectance ratio as above is read by the ADF type. In this case, in the read operation by the ADF type, the output of the A/D converter (16) is multiplied by 50/40 by the microprocessor, and the resultant data is determined as the read image output.

Figure 21A:
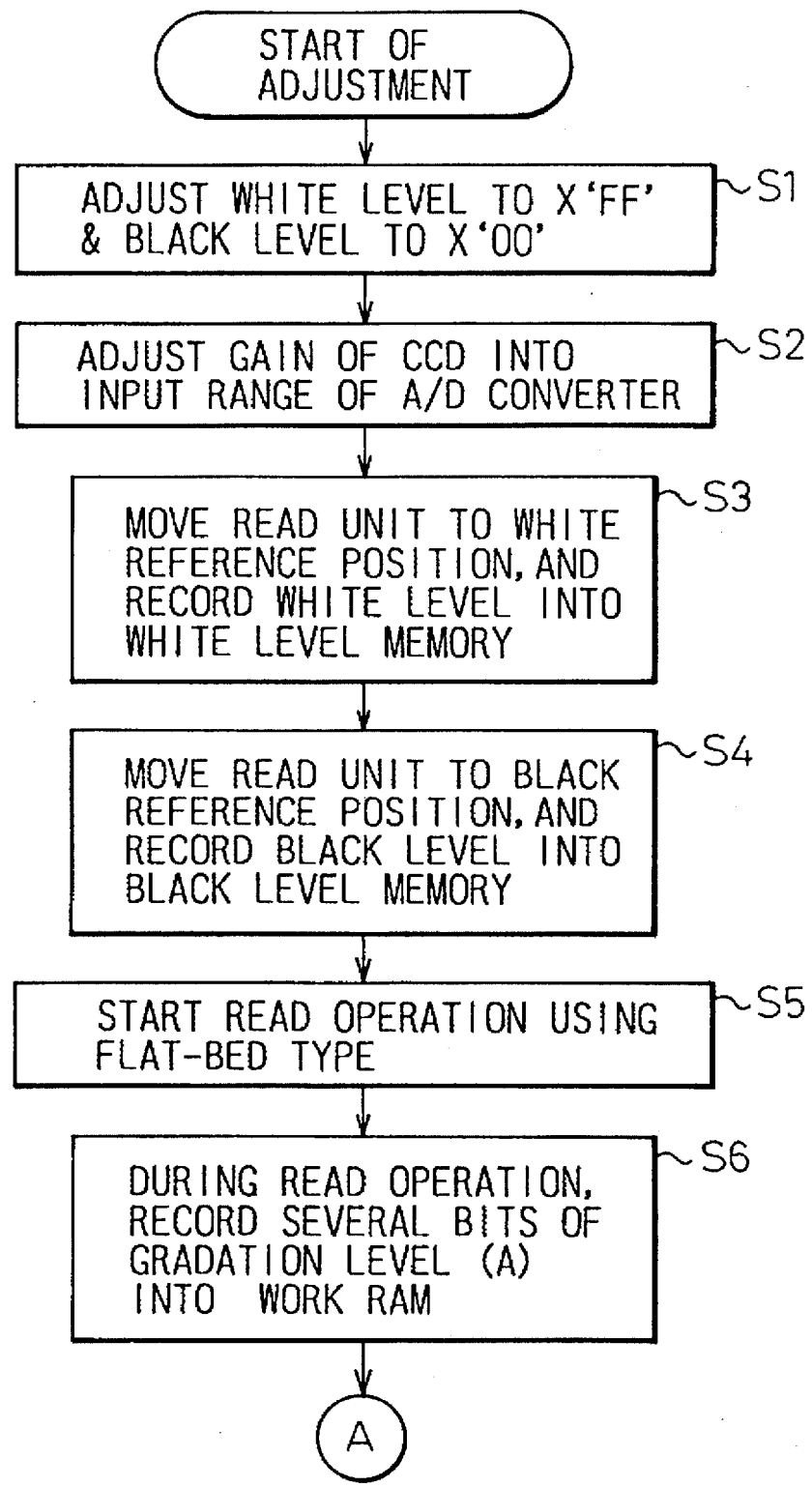
FIGS. 21A and 21B are flowcharts for explaining adjustment processes according to the present invention.
Figure 21B:
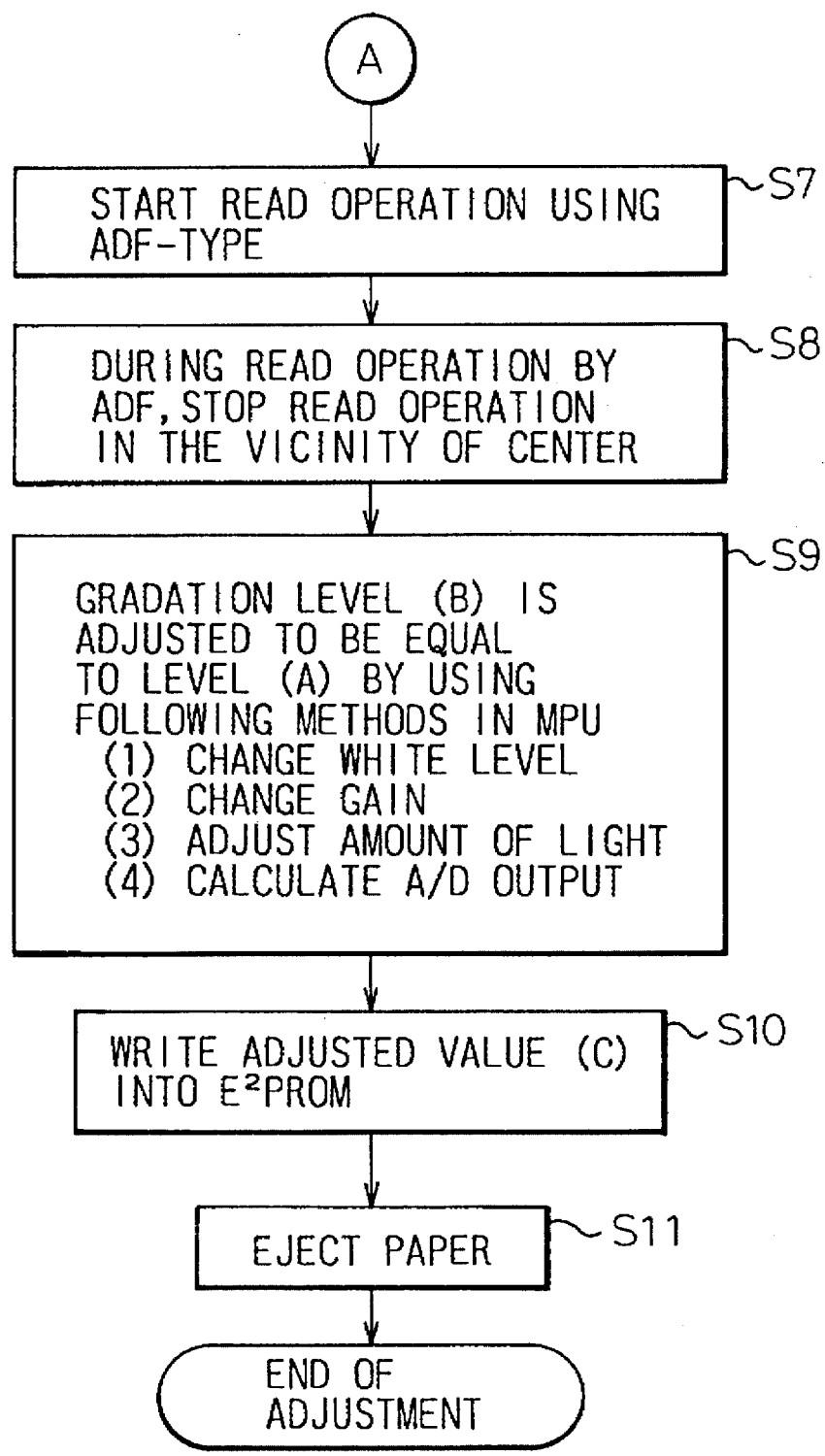

FIGS. 21A and 21B are flowcharts for explaining adjustment processes according to the present invention.

In step S1, the white reference level is given to the upper limit value (X'FF') of the input range of the A/D converter (16), and the black reference level is given to the lower limit value (X'00') of the input range of the A/D converter (16) by controlling the D/A converter (18) for the white level and the D/A converter (19) for the black level under the control by the microprocessor (21).

In step S2, the reference manuscript is put on the glass plate 3, and the gain of the AGC amplifier 12 is adjusted so that the CCD output is included within the input range of the A/D converter by controlling the D/A converter (13) under the microprocessor (21).

In step S3, the image read unit 4 is moved to the white reference position 3a, and the output of the A/D converter (16) is stored in the white level memory 17 as the white reference level under the control by the microprocessor (21).

In step S4, the image read unit 4 is moved to the black reference position 3b, and the output of the A/D converter (16) is stored in the black level memory 20 as the black reference level under the control by the microprocessor (21).

In step S5, the image read unit 4 in the FB type starts to read the manuscript.

In step S6, during the read operation by the FB type, the gradation levels for several bits are stored in the work RAM (22) under the control by the microprocessor (21) as the level A.

In step S7, the image read unit 4 in the ADF type starts to read the same manuscript.

In step S8, during a read operation by the ADF type, movement of the manuscript is temporarily stopped in the vicinity of the center of the manuscript (point A or B) in order to avoid a read error caused by fluctuation of the paper.

In step S9, the gradation level at the point B (ADF type) is adjusted so as to become equal to the level A (FB type) by changing, (a) the white reference level, (b) the gain of the AGC amplifier, or (c) the amount of the light, and by correcting (d) the calculation of the gradation using the conversion formula. The corrected value is stored in the memory, for example, $E^2PROM$.

In step S10, the manuscript is ejected from the image scanner.

The following are detailed explanations of above (a) to (d).

Regarding the above (a), during a read operation by the ADF type, movement of the manuscript is temporarily stopped at the predetermined position and the image output (i.e., level B) at that position is stored in the work RAM. The microprocessor compares the level B with the level A which is obtained by the FB type. Further, the microprocessor adjusts the white reference level by controlling the D/A converter (18) until the level B becomes equal to the level A.

Regarding the above (b), a during a read operation by the ADF type, movement of the manuscript is temporarily stopped at the predetermined position and the image output (i.e., level B) at that position is stored in the work RAM. The microprocessor compares the level B with the level A which is obtained by the FB type. Further, the microprocessor adjusts the gain of the AGC amplifier (12) by controlling the D/A converter (13) until the level B becomes equal to the level A.

Regarding the above (c), during a read operation by the ADF type, movement of the manuscript is temporarily stopped at the predetermined position and the image output (i.e., level B) at that position is stored in the work RAM. The microprocessor compares the level B with the level A which is obtained by the FB type. Further, the microprocessor adjusts the amount of the light of the lamp by controlling the D/A converter (11) and the transistor unit (15) until the level B becomes equal to the level A.

Regarding the above (d), during read operation by the ADF type, movement of the manuscript is temporarily stopped at the predetermined position and the image output (i.e., level B) at that position is stored in the work RAM. The microprocessor compares the level B with the level A which is obtained by the FB type. Further, the microprocessor calculates the correction value "C" so that the level B becomes equal to the level A. That is, correction value C can be expressed by $B=C\times A$. Where, "B" and "A" are levels as mentioned above.

We claim:

1. An image scanner comprising:
   an image read means at least including a lamp, a mirror and CCD sensors to read a manuscript;
   an image control means operatively connected to said image read means to process an image read by said image read means;
   a host computer operatively connected to said image control means;
   said image control means including a main printed-circuit board provided for original functions of said image scanner, a main connector connecting said image control means to said host computer, a user printed-circuit board selectively provided by a user as an extended slot and said board mounted within said image control means, and a user connector connecting said main printed-circuit board to said user printed-circuit board;
   wherein said image control means further comprises: a control circuit operatively connected to said CCD sensors; a microprocessor connected to said control circuit; a driver and a driver/receiver both connected to said control circuit; a video connector connected to said driver to send image signals to said host computer; a control connector connected to said driver/receiver to send and receive control signals to/from said host computer; and an extended connector connected between said control circuit and said extended slot to send and receive the image/control signals to/from said extended slot without passing through said driver and driver/receiver; and
   wherein said extended connector is used for testing the difference of an image output between said flat bed type and said automatic document type.

2. An image scanner comprising:
   an image read means at least including a lamp, a mirror and CCD sensors to read a manuscript;
   an image control means operatively connected to said image read means to process an image read by said image read means;
   a host computer operatively connected to said image control means; and
   said image control means including a main printed-circuit board provided for original functions of said image scanner, a main connector connecting said image control means to said host computer, a user printed-circuit board selectively provided by a user as an extended slot and said board mounted within said image control means, and a user connector connecting said main printed-circuit board to said user printed-circuit board;
   wherein said image control means further comprises; a control circuit operatively connected to said CCD sensors; a microprocessor connected to said control circuit; a driver and a driver/receiver both connected to said control circuit; a video connector connected to said driver to send image signals to said host computer; a control connector connected to said driver/receiver to send and receive control signals to/from said host computer; and an extended connector connected between said control circuit and said extended slot to send and receive the image/control signals to/from said extended slot without passing through said driver and driver/receiver; and
   wherein said image control means further includes a selection circuit operatively connected between said control circuit and said extended connector for selecting connection to either said driver/receiver or said extended slot.

* * * * *